(12) United States Patent
Yee et al.

(10) Patent No.: US 11,062,505 B2
(45) Date of Patent: Jul. 13, 2021

(54) METHOD AND SYSTEM FOR RENDERING AN OBJECT IN A VIRTUAL VIEW

(71) Applicant: CANON KABUSHIKI KAISHA, Tokyo (JP)

(72) Inventors: Belinda Margaret Yee, Balmain (AU); Berty Jacques Alain Bhuruth, Bankstown (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/346,081

(22) PCT Filed: Dec. 7, 2017

(86) PCT No.: PCT/AU2017/000265
§ 371 (c)(1),
(2) Date: Apr. 29, 2019

(87) PCT Pub. No.: WO2018/112498
PCT Pub. Date: Jun. 28, 2018

(65) Prior Publication Data
US 2019/0259199 A1 Aug. 22, 2019

Related U.S. Application Data

(63) Continuation of application No. 15/385,191, filed on Dec. 20, 2016, now Pat. No. 9,972,122.

(51) Int. Cl.
*G06T 15/30* (2011.01)
*G06T 19/20* (2011.01)
*G06T 15/40* (2011.01)

(52) U.S. Cl.
CPC .............. *G06T 15/30* (2013.01); *G06T 15/40* (2013.01); *G06T 19/20* (2013.01);
(Continued)

(58) Field of Classification Search
CPC ......... G06T 15/30; G06T 15/40; G06T 19/20; G06T 2210/21; G06T 2219/2016; G06T 2219/2024; G06T 7/20
See application file for complete search history.

(56) References Cited

U.S. PATENT DOCUMENTS

| 6,124,862 A | 9/2000 | Boyken et al. |
| 6,556,215 B1 * | 4/2003 | Haga ................. G06T 17/00 345/619 |

(Continued)

FOREIGN PATENT DOCUMENTS

| JP | 2005-319029 A | 11/2005 |
| JP | 2008-71260 A | 3/2008 |

(Continued)

OTHER PUBLICATIONS

Nesky, John, "50 Game Camera Mistakes," Games Developer Conference. YouTube [online], published Nov. 17, 2015, retrieved from the Internet <URL:https://www.youtube.com/watch?v=C7307qRmIMI>.

(Continued)

*Primary Examiner* — Maurice L. McDowell, Jr.
(74) *Attorney, Agent, or Firm* — Canon U.S.A., Inc., IP Division

(57) ABSTRACT

A computer-implemented system and method of rendering an object in a virtual view. The method comprises determining a variation of an occlusion measure of the object over time, the occlusion measure being an evaluation of an occlusion of the virtual view by the object, the variation of the occlusion measure determined based on a trajectory of the object. The method also comprises determining a transition effect for the object based on the variation of the occlusion measure, the transition effect being a visual effect, and applying the determined transition effect to render the (Continued)

object, the determined transition effect being applied according to a position of the object as the object moves along the trajectory.

27 Claims, 14 Drawing Sheets

(52) U.S. Cl.
CPC .. *G06T 2210/21* (2013.01); *G06T 2219/2016* (2013.01); *G06T 2219/2024* (2013.01)

(56) References Cited

U.S. PATENT DOCUMENTS

| | | | |
|---|---|---|---|
| 6,618,048 B1 | 9/2003 | Leather | |
| 7,796,132 B1 | 9/2010 | Nakagawa | |
| 8,665,260 B2 | 3/2014 | McCrae et al. | |
| 9,972,122 B1* | 5/2018 | Yee | G06T 15/30 |
| 2005/0018045 A1* | 1/2005 | Thomas | G06K 9/209 |
| | | | 348/157 |
| 2005/0195478 A1* | 9/2005 | Yanagawa | H04N 13/307 |
| | | | 359/462 |
| 2008/0192116 A1 | 8/2008 | Tamir et al. | |
| 2009/0128549 A1 | 5/2009 | Gloudemans et al. | |
| 2009/0128568 A1* | 5/2009 | Gloudemans | G06K 9/346 |
| | | | 345/474 |
| 2010/0026809 A1 | 2/2010 | Curry | |
| 2014/0240318 A1 | 8/2014 | Coombe | |

FOREIGN PATENT DOCUMENTS

| | | |
|---|---|---|
| JP | 2016-016319 A | 2/2016 |
| RU | 2431938 C2 | 10/2011 |

OTHER PUBLICATIONS

Tetsuya Watanabe, et al.; "3D Free-viewpoint video capturing interface by using bimanual operation"; 3DTV-Conference: The True Vision—Capture, Transmission and Display of 3D Video (3DTV-CON), 2010, IEEE, Piscataway; NJ, USA; Jun. 7, 2010 (Jun. 7, 2010); pp. 1-4.

Inamoto N et al.; "Virtual Viewpoint Replay for a Soccer Match by View Interpolation From Multiple Cameras"; IEEE Transactions on Multimedia, IEEE Service Center, US; vol. 9, No. 6, Oct. 1, 2007 (Oct. 1, 2007); pp. 1155-1166.

Inamoto, N, et al, "Virtual Viewpoint Reply for a Soccer Match by View Interpolation From Multiple Cameras", IEEE Transactions on Multimedia, IEEE Service Center, US, vol. 9, No. 6, Oct. 2007, pp. 1155-1166.

Watanabe, et al, "3D Free-viewpoint video capuring interface by using bimanual operation", 3DTV-Conference: The True Vision Capture, Transmission and Display of 3D Video (3DTV-CON), IEEE, US, Jun. 2010, pp. 1-4.

Bares, W. H., et al., "A Model for Constraint-Based Camera Planning", AAAI Technical Report SS-00-04, Retrieved from the Internet: URL:https://www.aaai.org/Papers/Symposia/Spring/2000/SS-00-04/SS00-04-014.pdf [retrieved on Jul. 10, 2020] (2000).

Jarusirisawad, S., et al., "Diminished reality using plane-sweep algorithm with weakly-calibrated cameras", Special issue: 3D image and video technology, 2010, pp. 11-20, No. 7.

"Creating Transitions and Timeline Animation in JavaFX"; Retrieved from the Internet: URL:https://web.archive.org/web/20120602191538/https://docs.oracle.com/javafx/2/animations/basics.htm [retrieved on Oct. 7, 2020].

Rosales, R., et al., "Improved Tracking of Multiple Humans with Trajectory Prediction and Occlusion Modeling", Proceedings IEEE Conf. on Computer Vision and Pattern Recognition. Workshop on the Interpretation of Visual Motion, 1998.

Youtube, "Blender Help #11; How to Animate Object Color Change", Retrieved from the Internet: URL:http:s//www.youtube.com/watch?v=5esz8N9y4kM [retrieved on Oct. 8, 2020].

Rudenko, A., et al., "Human Motion Trajectory Prediction; A Survey", Dec. 2019, arxiv.org, Cornell University Library, 201 Olin Library Cornell University Ithaca, NY 14853.

\* cited by examiner

METHOD AND SYSTEM FOR RENDERING AN OBJECT IN A VIRTUAL VIEW

RELATED APPLICATIONS

This application claims Convention priority from U.S. patent application Ser. No. 15/385,191, filed on 20 Dec. 2016, the entire contents of which are incorporated herein by reference in their entirety.

TECHNICAL FIELD

The present invention relates to virtual environments and a system and method for rendering an object interact in a virtual view of a virtual camera. The present invention also relates to a computer readable medium and apparatus for rendering an object in a virtual view.

BACKGROUND

When operating a physical camera in the physical world, a camera operator can see other physical objects (for example, people on a field) around the physical camera and choose to not collide with the physical objects. Further, the people on the field can see the physical camera and camera operator and choose to not collide with camera or operator. In a system where the camera operator is controlling a virtual camera, being a camera which exists virtually in a virtual reconstruction of physical world, the same affordances are not present.

The purpose of a virtual camera system is to capture camera footage simulating a physical camera but without the practical issues of having a physical camera in close proximity with objects in the real world. A physical camera can in some circumstances interfere with what is happening in a scene. The goal for a virtual camera system is to leverage the advantages of a virtual camera while keeping visual characteristics of a physical camera. For example, a virtual camera system may be able to fill the field of view with the object of interest if desired by the camera operator.

Virtual camera systems are usually associated with clipping planes, for example a near clipping plane and a far clipping plane. Clipping planes are typically orientated parallel to a virtual camera's image plane, and positioned close to the virtual camera for the near clipping plane and far in the distance for the far clipping plane. Clipping planes provide constraints onto the virtual camera's field of view and define where polygons of an object mesh become visible to, and rendered by, the virtual camera. The distance of the near clipping plane is set to both allow the object to approach the virtual camera while not causing the object to appear massively distorted. In practice, it is difficult to for the camera operator to know this distance and keep the object of interest just in front of the near clipping plane. Often, the object in the virtual camera view collides with a near clipping plane and the mesh of the object is sliced as the object is passed through the clipping plane. The virtual camera resultantly renders only a portion of the mesh of the object while also rendering a portion of the interior of the object mesh. Collision of an object with a clipping plane is an undesirable result especially if the virtual camera system is intended to produce realistic camera footage.

People in the physical world are not able to sense the position of the virtual camera, and as a result can freely collide with virtual cameras. The same is true for the camera operator controlling the virtual camera. The camera operator, likely controlling the virtual camera via a monitor screen will have a reduced level of context awareness and won't be able to sense objects around the virtual camera. The lack of context awareness means that objects can pass through the virtual camera from behind. The objects are initially out of view from the camera operator, and instantly fill the virtual camera's field of view as the objects pass the virtual camera's near clipping plane. The intruding object instantly filling the virtual camera view causes an interruption when trying to compose another object in the field of view of the virtual camera.

A need exists to address virtual objects visibly being clipped by the clipping plane. A need also exists to propose a method reducing disruptive occlusions caused by objects suddenly appearing in frame close to a virtual camera.

The video game industry has experienced similar problems, and has developed standard methods to address the problems described above. One known method implements a collision radius around objects ensuring that the objects do not collide with each other in the first place. Using a collision radius results in the camera bouncing off objects as they collide with the camera; undesirably adjusting the camera operator's composition. Another known method fades out an object when the object passes a distance threshold around the camera. This method treats all objects equally so objects passing through the camera from in front of the camera will fade out over the same distance as objects passing through the camera from behind.

SUMMARY

It is an object of the present invention to substantially overcome, or at least ameliorate, at least one disadvantage of present arrangements.

One aspect of the present disclosure provides a method for generating a virtual view video, the method comprising: determining a transition effect to be applied to an object within a field of view of a virtual camera based on a trajectory of the object and position along the trajectory of the object; and generating the virtual view video with visibility of the object modified based on the determined transition effect for display on a display device.

In some aspects, the trajectory is a predicted trajectory.

In some aspects, the transition effect is one of display, not display, fade in, fade out, transparency, colour transform, blend, brightness, saturation, texture, and style of the object.

In some aspects, the transition effect is determined based upon other objects in the virtual view.

In some aspects, determining the transition effect further comprises determining a variation of an occlusion measure of the object over time.

In some aspects, the occlusion measure is an evaluation of an occlusion of the virtual view by the object.

In some aspects, the variation of the occlusion measure is determined based on the trajectory of the object.

In some aspects, the variation in the occlusion measure is determined on a per object basis if more than one object is in the virtual view.

In some aspects, the occlusion measure is determined based on a size of the object relative to the virtual view.

In some aspects, the transition effect is determined based on a type of the object.

In some aspects, the transition effect is determined based upon a position of the object relative to a clipping plane associated with the virtual view.

In some aspects, the transition effect is determined based upon an amount of time the object is in the virtual view.

In some aspects, the transition effect is determined by comparing an amount of time the object is in the virtual view to a threshold.

In some aspects, the transition effect is applied based upon the occlusion measure satisfying a threshold.

In some aspects, the transition effect is applied when occlusion measure satisfies a first threshold and completes when the occlusion measure satisfies a second threshold.

In some aspects, the transition effect is applied based upon the occlusion measure satisfying at least one threshold, and the at least one threshold is modified based upon the object interacting with another object in the virtual view.

In some aspects, the transition effect is a visual effect.

In some aspects, the position of the object along the trajectory of the object within the field of view is predicted.

Another aspect of the present disclosure provides a non-transitory computer readable medium having a program stored thereon for generating a virtual view video, the program comprising: code for determining a transition effect to be applied to an object within a field of view of a virtual camera based on a trajectory of the object and position along the trajectory of the object: and code for generating the virtual view video with visibility of the object modified based on the determined transition effect for display on a display device.

Another aspect of the present disclosure provides apparatus for generating a virtual view video, the apparatus configured to: determine a transition effect to be applied to an object within a field of view of a virtual camera based on a trajectory of the object and position along the trajectory of the object; and generate the virtual view video with visibility of the object modified based on the determined transition effect for display on a display device.

Another aspect of the present disclosure provides a system comprising: a plurality of image capture devices; and a memory for storing data and a computer readable medium; and a processor coupled to the memory for executing a computer program, the processor in communication with the plurality of image capture devices via a network, the program having instructions for: determining a transition effect to be applied to an object within a field of view of a virtual camera based on a trajectory of the object and position along the trajectory of the object; and generating the virtual view video with visibility of the object modified based on the determined transition effect for display on a display device.

Another aspect of the present disclosure provides a computer-implemented method of rendering an object in a virtual view, the method comprising: determining a variation of an occlusion measure of the object over time, the occlusion measure being an evaluation of an occlusion of the virtual view by the object, the variation of the occlusion measure determined based on a trajectory of the object; determining a transition effect for the object based on the variation of the occlusion measure, the transition effect being a visual effect; and applying the determined transition effect to render the object, the determined transition effect being applied according to a position of the object as the object moves along the trajectory.

In some aspects, the trajectory is a predicted trajectory.

In some aspects, the transition effect is one of display, not display, fade in, fade out, transparency, colour transform, blend, brightness, saturation, texture, and style of the object.

In some aspects, the transition effect is determined based upon other objects in the virtual view.

In some aspects, the variation in the occlusion measure is determined on a per object basis if more than one object is in the virtual view.

In some aspects, the occlusion measure is determined based on a size of the object relative to the virtual view.

In some aspects, the transition effect is determined based on a type of the object.

In some aspects, the transition effect is determined based upon a position of the object relative to a clipping plane associated with the virtual view.

In some aspects, the transition effect is determined based upon an amount of time the object is in the virtual view.

In some aspects, the transition effect is determined by comparing an amount of time the object is in the virtual view to a threshold.

In some aspects, the transition effect is applied based upon the occlusion measure satisfying a threshold.

In some aspects, the transition effect is applied when occlusion measure satisfies a first threshold and completes when the occlusion measure satisfies a second threshold.

In some aspects, the transition effect is applied based upon the occlusion measure satisfying at least one threshold, and the at least one threshold is modified based upon the object interacting with another object in the virtual view.

Another aspect of the present disclosure provides a non-transitory computer readable medium having a program stored thereon for rendering an object in a virtual view, the program comprising: code for determining a variation of an occlusion measure of the object over time, the occlusion measure being an evaluation of an occlusion of the virtual view by the object, the variation of the occlusion measure determined based on a trajectory of the object; code for determining a transition effect for the object based on the variation of the occlusion measure, the transition effect being a visual effect; and code for applying the determined transition effect to render the object, the determined transition effect being applied according to a position of the object as the object moves along the trajectory.

Another aspect of the present disclosure provides apparatus for rendering an object in a virtual view, the apparatus configured to: determine a variation of an occlusion measure of the object over time, the occlusion measure being an evaluation of an occlusion of the virtual view by the object, the variation of the occlusion measure determined based on a trajectory of the object; determine a transition effect for the object based on the variation of the occlusion measure, the transition effect being a visual effect; and apply the determined transition effect to render the object, the determined transition effect being applied according to a position of the object as the object moves along the trajectory.

Another aspect of the present disclosure provides a system comprising: a plurality of image capture devices; and a memory for storing data and a computer readable medium; and a processor coupled to the memory for executing a computer program, the processor in communication with the plurality of image capture devices via a network, the program having instructions for: generating a virtual view using data received from the plurality of image capture devices; determining a variation of an occlusion measure of an object in the virtual view over time, the occlusion measure being an evaluation of an occlusion of the virtual view by the object, the variation of the occlusion measure determined based on a trajectory of the object; determine a transition effect for the object based on the variation of the occlusion measure, the transition effect being a visual effect; and apply the determined transition effect to render the object, the determined transition effect being applied according to a position of the object as the object moves along the trajectory.

BRIEF DESCRIPTION OF THE DRAWINGS

One or more embodiments of the invention will now be described with reference to the following drawings, in which.

DETAILED DESCRIPTION INCLUDING BEST MODE

The present disclosure relates to virtual environments and how virtual objects interact with a field of view of a virtual camera when the virtual objects are close to the virtual camera and the near clipping plane. The arrangements described relate to allowing objects to occlude large portions of the field of view if the occlusion is determined to reflect a likely intent of the camera operator.

Figure 1:
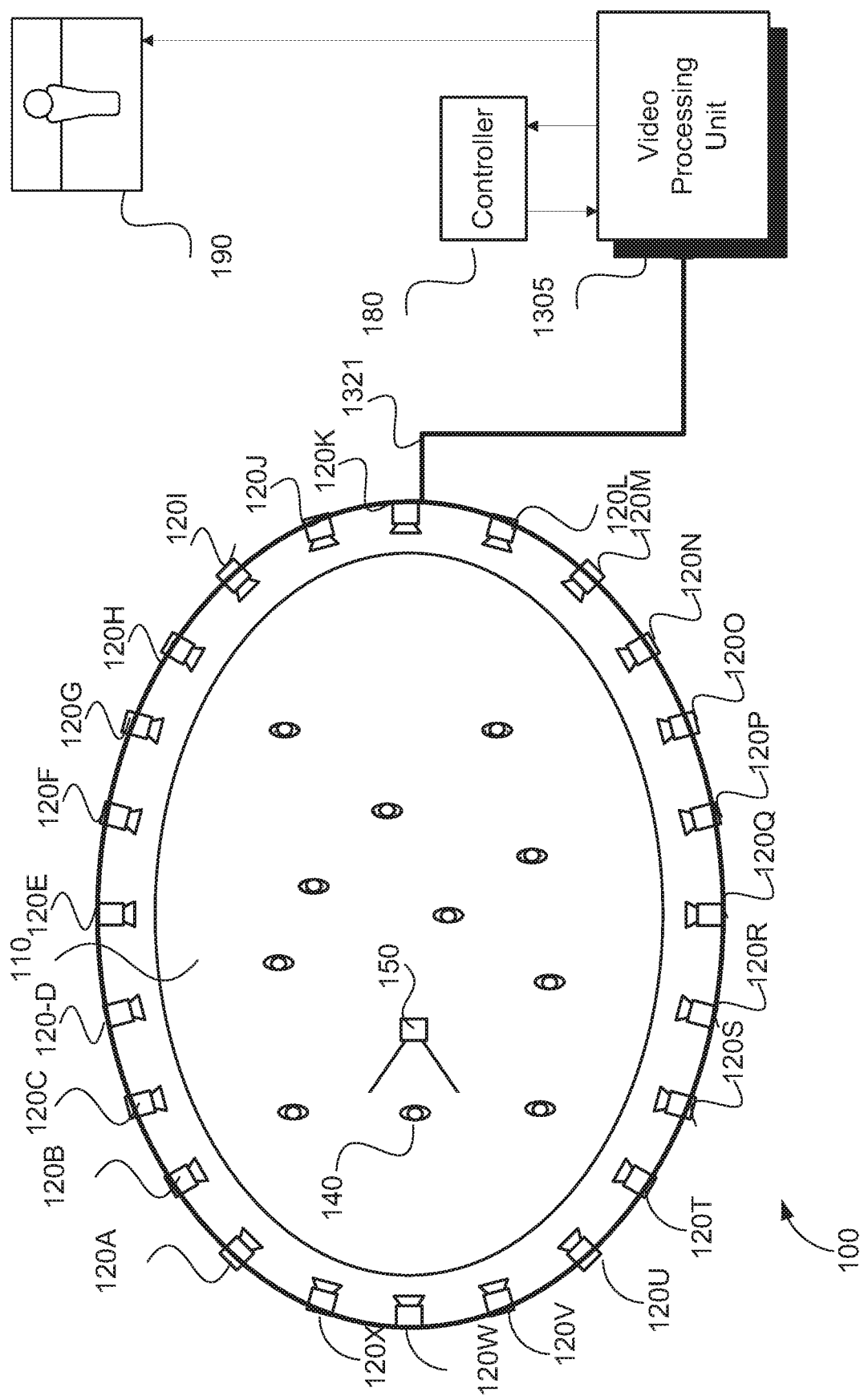
FIG. 1 shows an example of a system of networked video cameras surrounding a sports stadium, the video camera feeding video data to a processing system.

The arrangements described herein are intended for use in the context of a performance arena as exemplified in FIG. 1. As shown in FIG. 1, a system 100 includes an arena 110 assumed to be centered on a playing field that is approximately rectangular, oval or circular, allowing the arena 110 to be surrounded by one or more rings of cameras 120A to 12X. As seen in FIG. 1, the arena 110 includes a single ring of cameras 120A to 120X. Each of the plurality of cameras 120A to 120X is located at a predetermined location with respect to the arena 110. In the arrangements described the arena 110 is a field, however in other arrangements the arena 110 can be a music stage, theatre, public or private venue.

The field 110, in the example of FIG. 1, contains at least one object 140. The object 140 can be a person or people, a ball, a vehicle or any structure.

The cameras 120A to 120X shown in FIG. 1 are synchronised to acquire frames at the same instants in time so that all points on the field 110 are captured simultaneously from a large number of viewpoints. In some variations, the full ring of cameras 120 A to 120X shown in FIG. 1 is not employed but rather some subsets of a full perimeter of the arena 110 are employed. Arrangements that do not use a full ring of cameras may be advantageous when certain viewpoints are known to be unnecessary ahead of time.

Figure 13A:
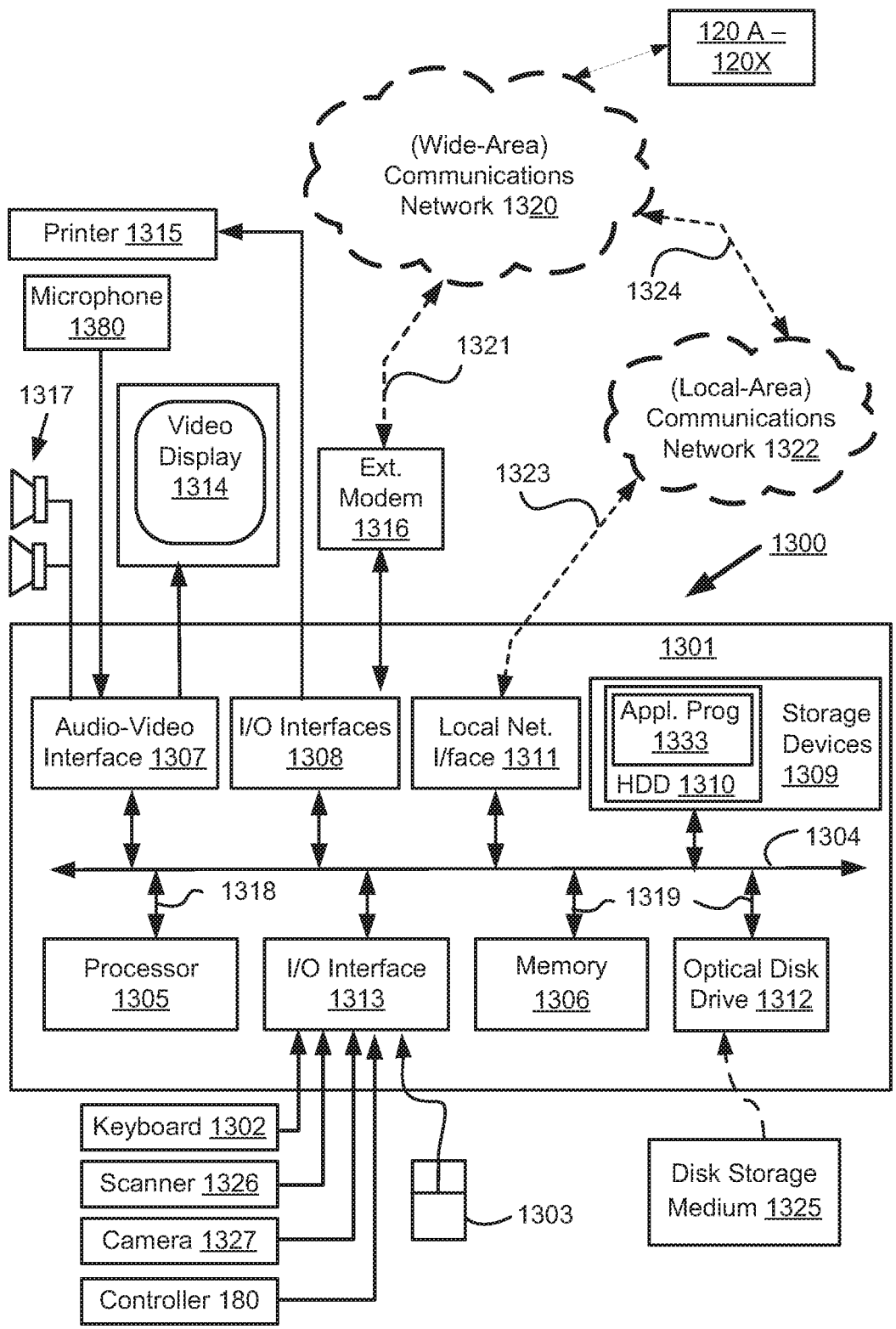
FIGS. 13A and 13B form a schematic block diagram of a general purpose computer system upon which arrangements described can be practiced.
Figure 13B:
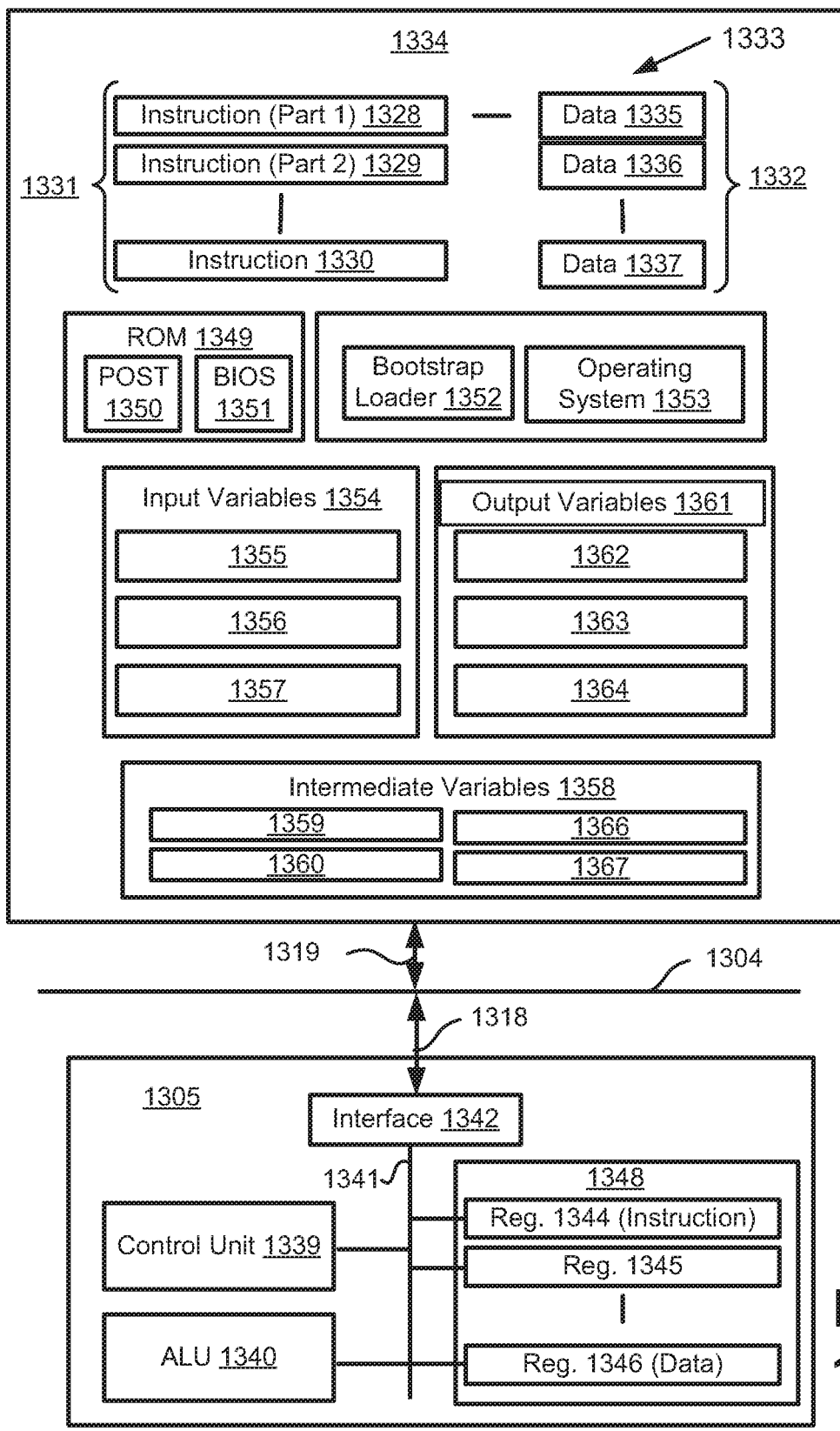

Video frames captured by the cameras 120A to 120X are subject to processing and temporary storage near one of the cameras, for example the camera 120A, prior to being made available via a network connection 1321 (see FIG. 13A) to a processing unit 1305 (see FIGS. 13A and 13B). The processing unit 1305 receives controlling input from a controller 180 that specifies the position, orientation, zoom and possibly other simulated camera features for a virtual camera 150 within the field 110. The controller 180 is typically operated by a user of the system 100, and may be any controller suitable for setting parameters of the cameras 120A to 120X. As seen in FIG. 13A, the processing unit 1305 is configured within a computer module 1301. However, in alternative implementations, a separate video processing unit may be used to implement the described arrangements.

The processing unit 1305, also referred to as a processor, is configured to synthesize or generate a specified virtual camera view 190 based on the video streams available to the processing unit 1305 from the cameras 120A-120X surrounding the field 110.

The phrase "virtual camera" relates to a camera having functionality computationally derived. The functionality is computationally derived by methods such as interpolation between physical cameras (such as the cameras 120A to 120X) or by rendering from a modelled 3D scene constructed using data from physical cameras (120A-120X) surrounding a scene, rather than simply the output of any single physical camera. A virtual camera relates to rendering a virtual view, for example a video sequence, using pixel data obtained from one or more physical cameras. The virtual view relates to a field of view of the virtual camera. The physical cameras 120A to 120X can be any image capture devices capable of capturing image or video data, for example digital or video cameras. The cameras 120A to 120X are preferably high resolution cameras suitable for generating broadcast video, for example for sports broadcasts.

A virtual camera location input may be generated by a human virtual camera operator and be based on input from a user interface device such as a joystick, mouse, such as a mouse 1303 in FIG. 13A, or similar controller, such as the controller 180, including dedicated controllers comprising multiple input components. Alternatively, the virtual camera position may be generated fully automatically based on analysis of game play. Hybrid control configurations are also possible whereby some aspects of camera positioning are directed by a human operator and others by an automated algorithm. For example, coarse positioning can be performed by a human operator and fine positioning, including stabilization and path smoothing, performed by an automated algorithm executed on the processor 1305.

The processing unit 1305 is configured to achieve frame synthesis, that is to render the virtual camera view, using image based rendering methods known in the art. Image based rendering methods are based on sampling pixel data from a set of cameras of a known geometric arrangement and combining the sampled pixel information into a synthesized frame. In addition to sample based rendering of the requested frame, the processing unit 1305 can also be configured to perform synthesis, 3D modelling, in-painting or interpolation of regions as required covering sampling deficiencies to create frames of high quality visual appearance. The processor 1305 may also be configured to provide feedback in form of frame quality or completeness of camera coverage for a requested viewpoint so that the controller device 180 generating the camera position control signal can be aware of the practical bounds of the processing system 100. Video streams for the virtual view 190 created or rendered by the processing unit 1305 may subsequently be provided to a production desk (not depicted). The video streams are edited together at the production desk to form a broadcast video. Alternatively the video streams can be broadcast unedited or stored for later compilation.

The flexibility afforded by the system 100 described above presents a secondary set of problems not previously anticipated in broadcast transmission such as sports coverage. For example, the virtual camera 150 is free to move position and/or orientation on the field 110 without the need for a physical object or a camera operator to be in a particular position. Further, as described above, clipping of an object in the virtual view can occur.

As described above, some known methods relating to virtual cameras define a threshold distance to avoid clipping By defining a threshold distance it is difficult to simultaneously solve problems of allowing an object of interest to fill the field of view, and of preventing an object approaching from behind a virtual camera to fill the field of view and occlude any possible objects of interest.

FIGS. 13A and 13B depict a general-purpose computer system 1300, upon which the various arrangements described can be practiced.

As seen in FIG. 13A, the computer system 1300 includes: the computer module 1301; input devices such as a keyboard 1302, the mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via the connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327, controller 180 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practiced include IBM-PC's and compatibles, Sun Sparcstations, Apple Mac™ or like computer systems.

Figure 3:
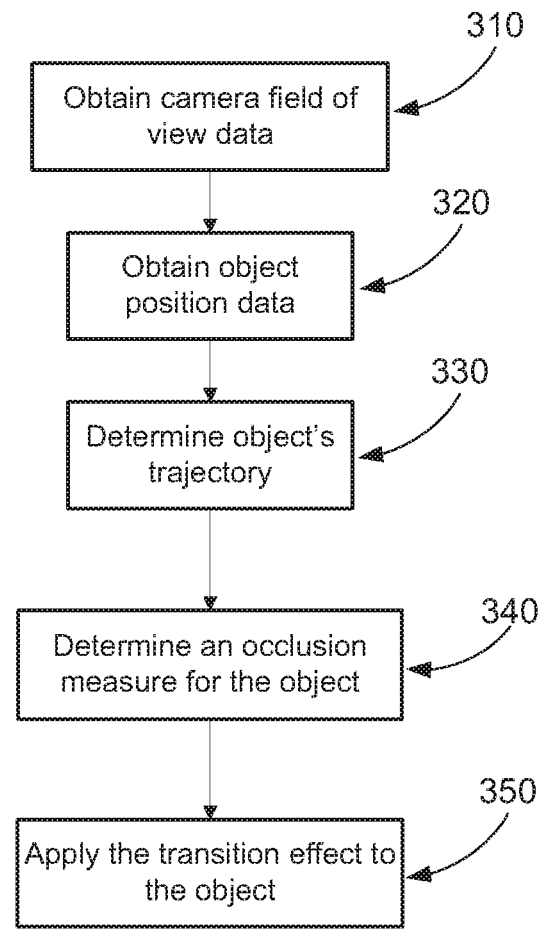
FIG. 3 shows a schematic flow diagram of a method of rendering an object in a virtual view according to one example embodiment.
Figure 4:
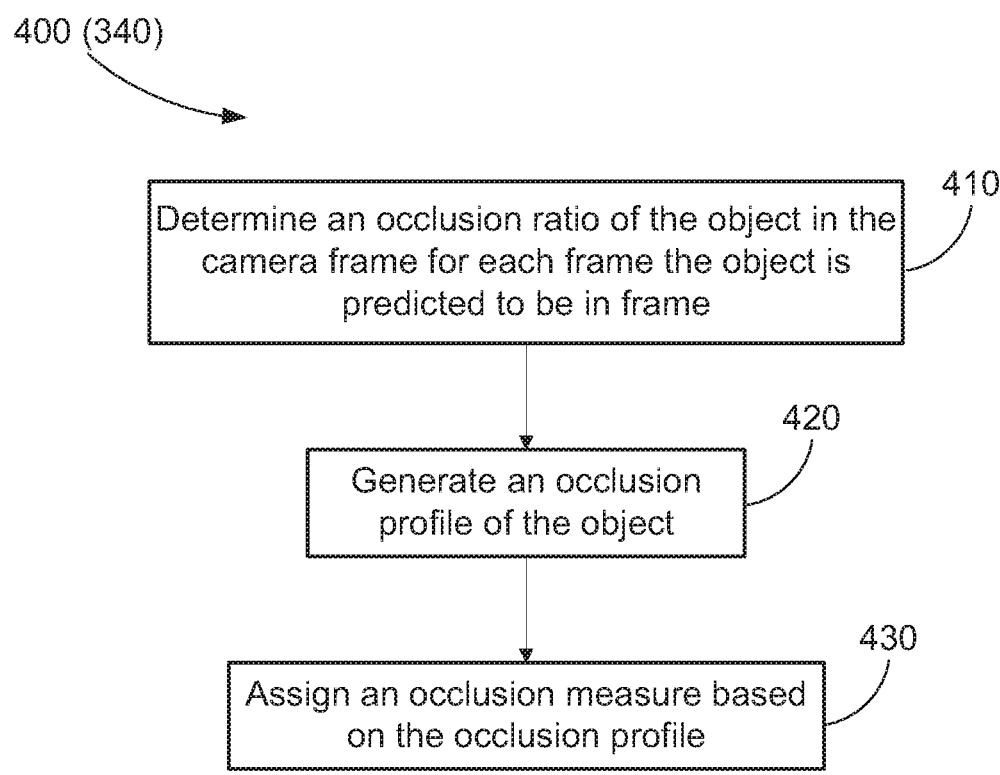
FIG. 4 shows a schematic flow diagram of a method of determining an occlusion measure as used in the method of FIG. 3.

The methods described may be implemented using the computer system 1300 wherein the processes of FIGS. 3 and 4, to be described, may be implemented as one or more software application programs 1333 executable within the computer system 1300. In particular, the steps of the methods of FIGS. 3 and 4 are effected by instructions 1331 (see FIG. 13B) in the software 1333 that are carried out within the computer system 1300. The software instructions 1331 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for implementing the arrangements described.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for implementing the methods described.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The described arrangements use input variables 1354, which are stored in the memory 1334 in corresponding memory locations 1355, 1356, 1357. The described arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

- a fetch operation, which fetches or reads an instruction 1331 from a memory location 1328, 1329, 1330;
- a decode operation in which the control unit 1339 determines which instruction has been fetched; and
- an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 3 and 4 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The methods described may alternatively be implemented in dedicated hardware such as one or more integrated circuits performing the functions or sub functions of FIGS. 3 and 4. Such dedicated hardware may include graphic processors, digital signal processors, or one or more microprocessors and associated memories.

Figure 2:
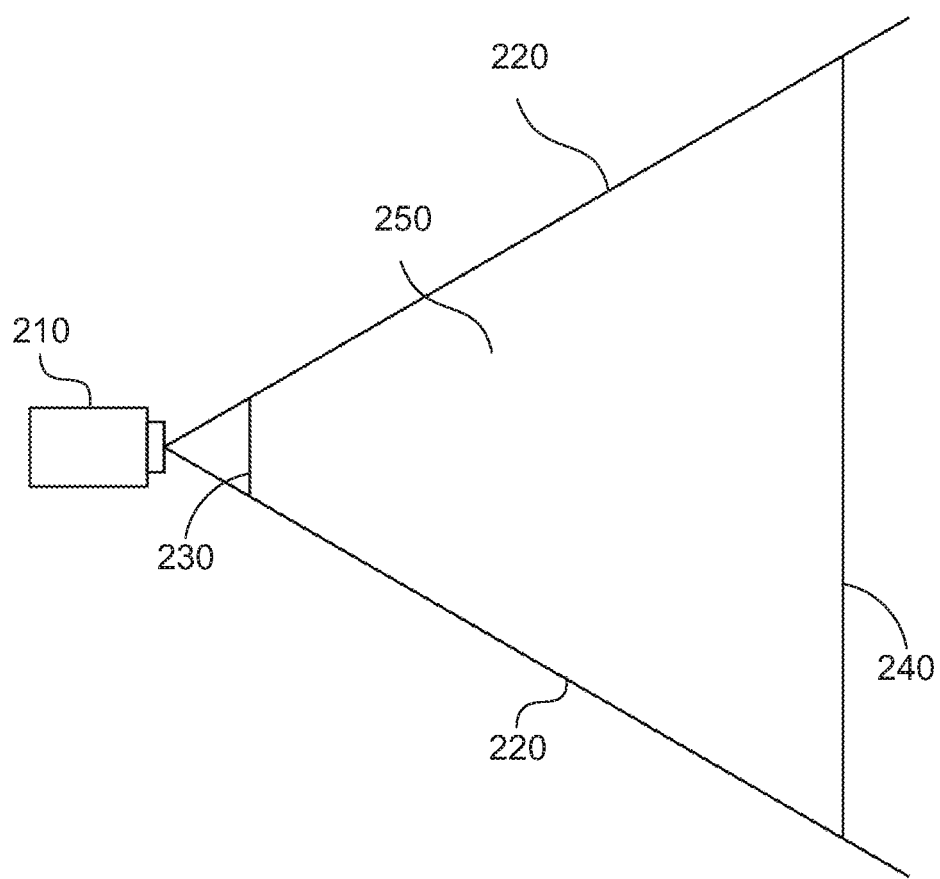
FIG. 2 shows an example of a virtual camera.

FIG. 2 is an orthographic depiction of a virtual camera 210 (similar to the virtual camera 150) used in the arrangements described. The virtual camera 210 has a field of view 250. The field of view 250 is limited by edges 220, a near clipping plane 230 and a far clipping plane 240. Objects which enter the field of view 250 become visible to the virtual camera 210. The near clipping plane 230 is set at a depth close to the virtual camera 210 while the far clipping plane 240 is set at a depth relatively far from the camera 210. Even though the virtual camera 210 has the far clipping plane 240, the arrangements described relate to the near clipping plane 230. For ease of reference all following representations depict virtual cameras, for example the virtual camera 210 with respect to only a near clipping place, for example the near clipping plane 230.

Objects moving around the field 110 can enter the field of view 250 of the virtual camera 210 from any direction without the camera operator's knowledge, causing occlusions disrupting the camera operator's framing of an intended object of interest.

The arrangements described relate to a method for rendering an object in a virtual view based on a determined occlusion measure derived from the object's trajectory and a virtual camera's field of view. Applying the transition effect to the object ensures the virtual camera does not render the object as the object is being clipped by the near clipping plane. In determining an occlusion measure, the arrangements described allow objects that disruptively occlude the field of view have a transition effect applied which reduces the disruptive occlusion. In the context of the present disclosure, disruptive occlusion relates to occluding a potential object of interest or occlusion of more than a predetermined portion of the field of view, for example 50% of the field of view.

FIG. 3 shows a method 300 of rendering an object in a virtual camera field of view. The method 300 is typically implemented as one or more modules of the application 1333, stored on the hard drive 1310 and executed under control of the processor 1305.

The method 300 starts at an obtaining step 310. At the step 310, data reflecting the field of view 220 of the virtual camera 210 is obtained. The field of view data is obtained from construction of the virtual camera by the processor 1305 using video data received from the physical cameras 120A to 120X, in the example of FIG. 1e. The field of view data is updated to reflect changes made to parameters the physical cameras 120A to 120X by the camera operator with input data from the controller 180 if appropriate.

The method 300 continues under execution of the processor 1305 from step 310 to an obtaining step 320. At step 320, position data of an object on the field 110 is obtained. In one arrangement, the object is a person on the sporting field. In other arrangements, the object is not a person but could be a ball or a vehicle or some other type of object. One method for obtaining position data for an object is through a tracking device (not shown) affixed to the object. The tracking device comprises a GPS receiver which would transmit the object's coordinates to a central location through a wireless connection, e.g. IEEE 802.11 or RFID. In an alternative arrangement, position data could be extracted from the reconstruction of the video frames, an example being; using the array of cameras 120A-120X and the corresponding views. The application 1333 uses optical character recognition (OCR) to extract identifying features from objects such as names and player numbers. In an alternate arrangement, position data could be extracted from the constructed 3D model. The system 100 can be initially started when the arena is empty providing a baseline. Once objects enter the arena and are represented in the 3D model, the difference between the current 3D model and the baseline 3D model indicates the position of objects. In other arrangements, the application 1333 follows a set of rules based on object size, movement speed, and position to classify types of objects identified in the model. For example, a relatively small object which moves quickly on and above the arena is classified as the ball, and a medium sized object approximately 1.7 m tall which moves along the ground is classified as a person.

The method 300 continues under execution of the processor 1305 from step 320 to a determining step 330. At step 330, the object's trajectory is determined. There are implementations for determining the object's trajectory. In one arrangement, the application 133 generates a virtual reconstruction of a previously captured event (Replay), where the object's movements are known. In another arrangement, the application 133 generates a virtual reconstruct in real time (live) where the object's trajectory is a predicted trajectory. The predicted trajectory is for example determined based on the current trajectory, using the current position and current speed and velocity and then extrapolating forward in time.

The method 300 continues under execution of the processor 1305 from step 330 to a determining step 340. At step 340, an occlusion measure for the object is determined. A method 400 of determining an occlusion measure, as implemented at step 340, is described below in relation to FIG. 4. In determining an occlusion measure, the step 340 also operates to select a transition effect, being a visual effect.

The method 300 continues under execution of the processor 1305 from step 340 to an application step 350. At step 350, a transition effect is applied to the object based on the determined occlusion measure. The transition effect is applied according to a position of the object moving along a trajectory. Applying the transition effect operates to render the object in a virtual view, such as the view 190. In one arrangement, a transparency transition effect is applied to the object. However other arrangements apply one or a combination of transition effects, such as selecting whether to display or not display, fade in, fade out, change or transform colour transform, blend, brightness, saturation, texture, visual effect, or style of the object. The transition effect could also be based on a type of the object and a relative size of the object. For example, a transparency transition effect could be used for a person, a textural transition effect could be used for a structure like a goal post and colour transition effect could be used for the ball.

FIG. 4 shows the method 400 for determining an occlusion measure for an object. The method 400 is typically implemented as one or more modules of the application 1333, stored on the hard drive 1310 and executed under control of the processor 1305.

The method 400 starts at a determining step 410. At step 410, an occlusion ratio of the object is determined for each frame of the virtual camera field of view in which the object is predicted to be. The occlusion ratio relates to a ratio of how much the object occludes the background of the scene.

The occlusion ratio is determined on a per object basis (through object tracking methods), as if the object in question was the only object in view. In determining the occlusion ratio a per object basis, determination of the occlusion ratio is not influenced by other objects in front of the main object, possibly affecting a viewer's impression of how much of an occlusion is created.

The method 400 continues from step 410 to a generation step 420. At step 420, the application 1333 executes to generate an occlusion profile, also referred to as an occlusion measure, based on the change of the occlusion ratio over time. The occlusion profile (measure) represents an evaluation of occlusion of a virtual view by the object. Variation of the occlusion profile is determined based on a trajectory of the object. Aspects of the occlusion profile are described in relation to FIG. 5. As the occlusion ratio relates to a ratio of how much the object occludes a virtual view, the occlusion profile relates to the size of the object.

The method 400 continues from step 420 to an assigning step 430. At step 430, an occlusion measure is assigned to the object based on the occlusion profile. For example, the selected occlusion measure may be stored in the memory 1309 in association with data representing the virtual camera. The method 400 ends after step 430.

Figure 5:
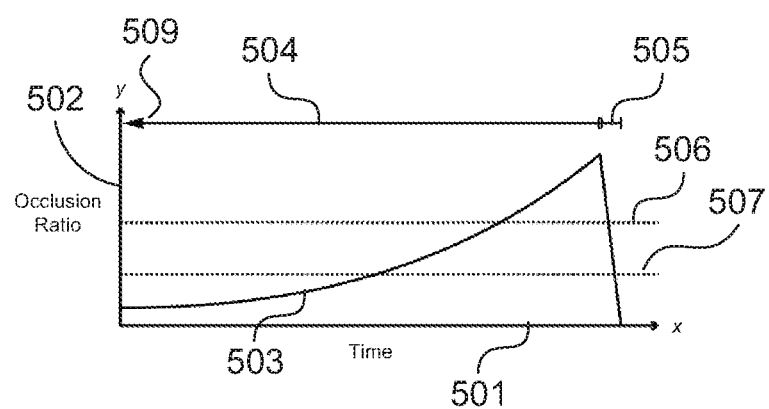
FIG. 5 shows an example graph plotting an occlusion profile of an object in a field of view of a virtual camera.

FIG. 5 shows an example of a graph 500 of an occlusion profile. The graph 500 charts change of occlusion ratio of an object relative to a field of view over time. The x-axis 501 maps time. Time can be measured in relation to a number of frames or in standard timecode. The y-axis 502 graphs an amount of occlusion based on the occlusion ratio. A line 503 represents the occlusion profile by profiling the change of occlusion for an object over time. A line 504 indicates an amount of time since the object has had occlusion greater than zero until the object reaches peak occlusion.

An arrow 509 at one end of the line 504 indicates that the end of the occlusion profile is beyond the limits of the graph 500. A line 505 indicates an amount of time since the object's peak occlusion to when the object's occlusion reaches zero (being fully clipped by the clipping plane 230 for example). The times indicated by the lines 504 and 505 are added to determine a total time the object is in the field of view 250. Amounts of time indicated by the lines 504 and 505 are used in determining the occlusion measure of the object. Two dotted lines 506 and 507 represent an upper and a lower occlusion threshold respectively. The upper occlusion threshold 506 and the lower occlusion threshold 507 are typically determined by user testing for a particular context (for example type of sport) or arena. The upper occlusion threshold 506 and the lower occlusion threshold 507 are used in applying the transition effect to the object.

FIGS. 6A to 6D show an example scenario where an object, in this case a person, is approaching a virtual camera from within the virtual camera's field of view.

Figure 6A:
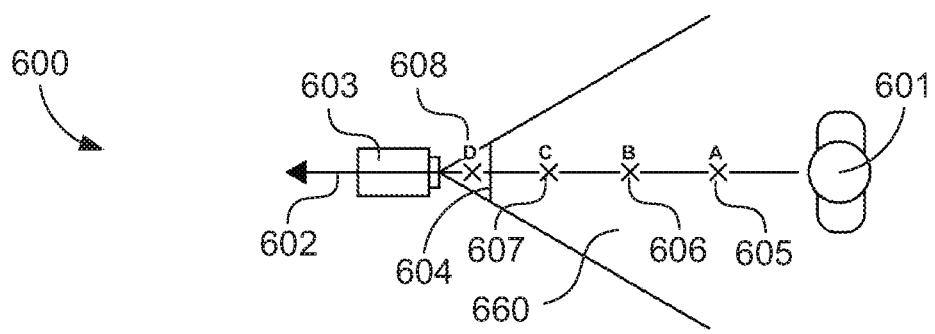
FIGS. 6A to 6D show an example of applying a transition effect based on an occlusion measure when an object is approaching from in front of a virtual camera.
Figure 6B:
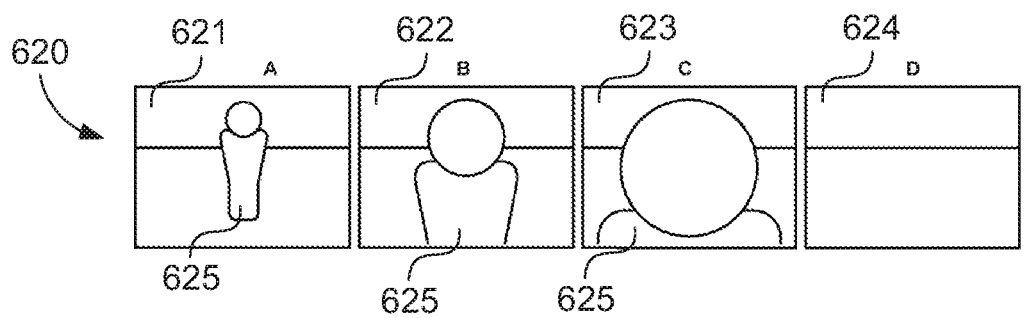

FIG. 6A shows a top down view of a scene 600. An object 601 is approaching a virtual camera 603 with a trajectory 602. The virtual camera 603 has a field of view 660. Points A 605, B 606, C 607 and D 608 each respectively represent sequential moments of the object 601 moving along the trajectory 602. Points A 605, B 606, C 607 relate to moments when the object 601 is in front of the camera 603's near clipping plane 604. Point D 604 relates to a moment when the object 601 has passed the near clipping plane 604. A far clipping plane of the virtual camera view is excluded from FIG. 6A (and similarly from FIGS. 7A to 12A) for ease of reference.

A sequence 620 (FIG. 6B) shows video frames captured or rendered by the virtual camera 601 when the object 601 is at the points A 605, B 606, C 607 and D 608 and the arrangements described are not practiced, for reference. Frames A 621, B 622, C 623 and D 624 of the sequence 620 respectively show an object 625 (corresponding to the object 601) approaching the virtual camera 603 at points A, B, C, and D (605 to 608). The object 625 is visibly clipped by the near clipping plane 604 in frames between frames C 623 and D 624.

Figure 6C:
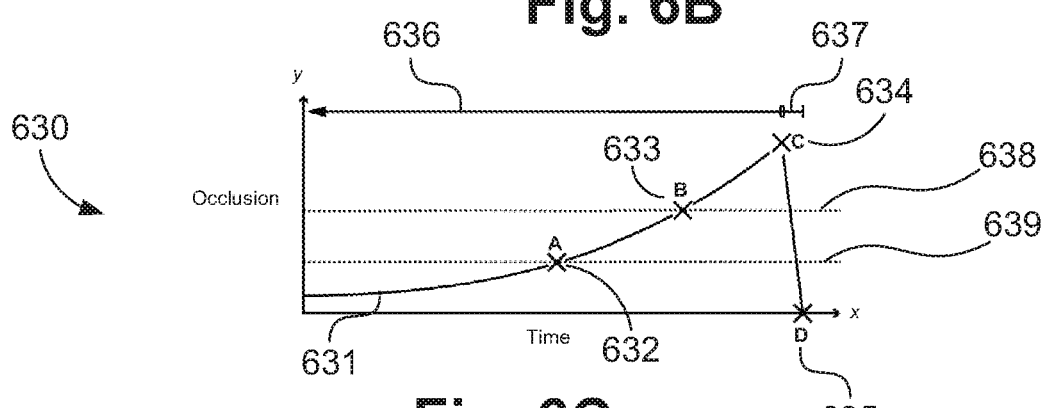
Figure 6D:
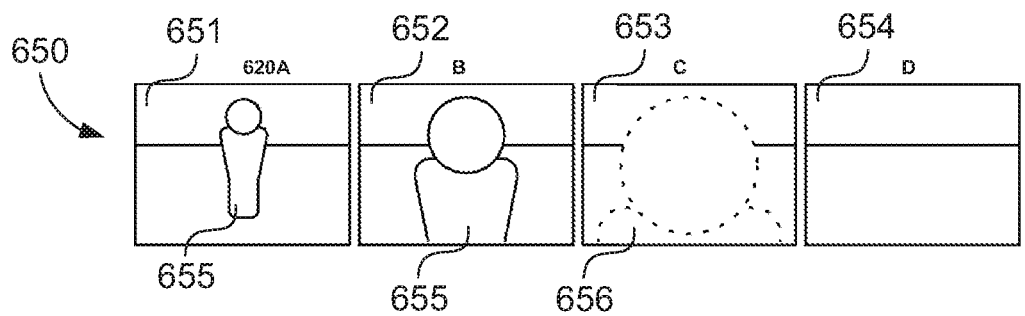

FIG. 6C shows a corresponding graph 630 of an occlusion profile for the object 601 as a result of executing step 420. An occlusion profile 631 shows the amount of occlusion the object 601 causes over time relative to the field of view 660. As the object 601 is already in the field of view of the camera 603 there is a small amount of occlusion at the start of the profile 631. The points A 605, B 606, C 607 and D 608 of FIG. 6A are represented on the occlusion profile 631 as markings A 632, B 633, C 634 and D 635 respectively. Marking C 634 represents a moment of peak occlusion before the object 601 starts being clipped by the clipping plane 604, resulting in the lowering of the object's occlusion. Marking D 635 represents a moment occlusion by the object 601 reaches zero and the object 601 is fully clipped out of view. As shown in FIG. 6C, the occlusion profile (measure) 631 represents an evaluation of occlusion of the virtual field of view by the object 601 and variation of the profile 631 is determined based on the trajectory 602 of the object 601.

Execution of step 430 assigns an occlusion measure to the object based on determined variation in the occlusion profile 631. Addition of the amounts of time indicated by lines 636 and 637 determines a total time for the object being in the field of view 660. In the scenario of FIGS. 6A to 6D, the application 1333 executes to allow the object to occlude as much of the field of view 660 as possible before a transition effect is applied by hiding any object clipping caused by the clipping plane 604. The object is allowed to occlude as much of the field of view as possible by determining the amount of time indicated by the line 636. If the amount of time indicated by the line 636 is above a predetermined threshold, e.g. 1 second, the object 601 has an established presence in the field of the view 660 and continues to be present until a time to apply the transition effect is reached. The predetermined threshold is typically determined by user testing of the system 100. Once the transition effect for the object is determined at step 430, occlusion thresholds 638 and 639 are used to apply the transition effect at step 350. The step 430 operates to assign an occlusion measure by selecting a transition effect, such as transparency, and when to apply the transition effect in the video sequence generated by the virtual camera 603.

Application of the transition effect at execution of step 350 relates to the occlusion thresholds 638 and 639 (similar to the occlusion thresholds 506 and 507 of FIG. 5). In the example of FIGS. 6A to 6D, the application 1333 begins the transition effect when the occlusion profile 631 traverses an upper occlusion threshold 638 at mark B 633 and completes the transition effect at mark C 634. In the example of FIGS. 6A to 6D the transition effect is not used at the marking D 635. Accordingly, the transition effect is applied according to positions of the object 601 as the object 601 moves along the trajectory 602.

A sequence 650 (FIG. 6D) shows frames captured by the virtual camera 603 when the object 601 is at the points A 605, B 606, C 607 and D 608 and the arrangements described are applied. Frames A 651, B 652, C 653 and D 654 of the sequence 650 respectively show an object 655 (corresponding to the object 601) approaching the virtual camera 603. As a result of executing step 350, in frame B 652 the object 655 is visible and in frame C 653 an object 656 (corresponding to 655) has a transition effect applied so as to be transparent and imperceptible to a viewer (indicated by dotted lines). In between the frames C 653 and D 654 the object 601 is clipped, however the virtual camera 603 does not render the object 601 as the object 601 is transparent.

FIGS. 7A to 7D show an example scenario where an object, in this case a person, is approaching a virtual camera from behind the virtual camera into the virtual camera's field of view.

Figure 7A:
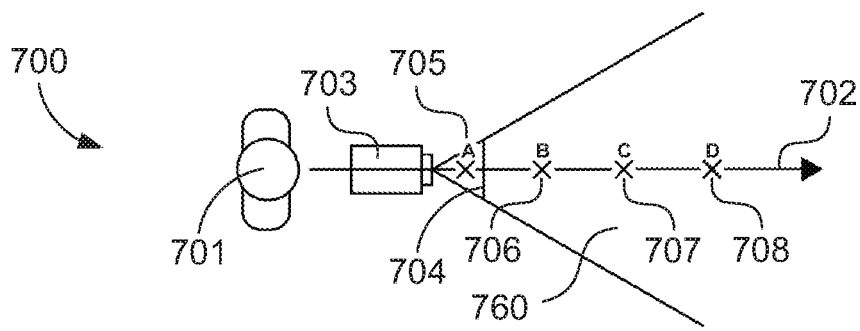
FIGS. 7A to 7D show an example of applying a transition effect based on an occlusion measure when an object is approaching from behind a virtual camera.

FIG. 7A shows a top down view of a scene 700. An object 701 is approaching a virtual camera 703 with a trajectory 702. The virtual camera 703 has a field of view 760. Points A 705, B 706, C 707 and D 708 each respectively represent sequential moments of the object 701 in moving along the trajectory 702. Point A 705 relates to a moment when the object 701 is behind a near clipping plane 704 of the virtual camera 703. Points B 706, C 707 and D 708 relate to moments when the object 701 has passed the near clipping plane 704.

Figure 7B:
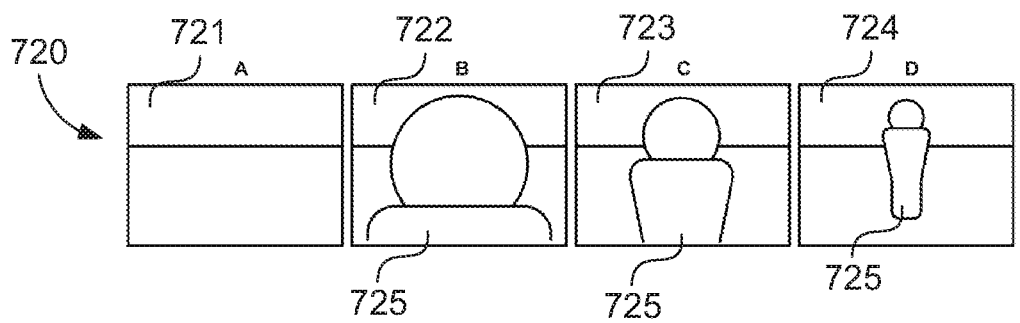

A sequence 720 in FIG. 7B shows video frames captured by the virtual camera 703 when the object 701 is at the points A 705, B 706, C 707 and D 708 respectively and the arrangements described are not practiced, for reference. Frames A 721, B 722, C 723 and D 724 of the sequence 720 respectively show an object 725 (corresponding to the object 701) entering the field of view 760 and moving away from the virtual camera 703. The object 725 is visibly clipped by the near clipping plane 704 in frames between frame A 721 and B 722.

Figure 7C:
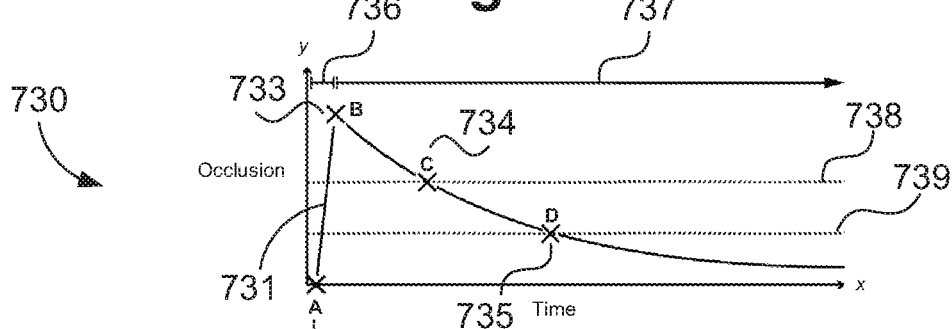

FIG. 7C shows a corresponding graph 730 of an occlusion profile for the object 701 as a result of execution of step 420. An occlusion profile 731 shows an amount of occlusion the object 701 causes over time. Points A 705, B 706, C 707 and D 708 are represented on the occlusion profile 731 as markings A 732, B 733, C 734 and D 735 respectively. As the object 701 starts out of the field of view 760 the profile 731 starts with zero occlusion as represented by Point A 732. Marking B 734 represents a moment of peak occlusion after the object 701 enters the field of view 760 and stops being clipped by the clipping plane 704.

Step 430 executes to assign an occlusion measure by selecting a transition effect for the person 701. Addition of the amounts of time indicated by lines 736 and 737 at step 430 determines a total time for the object 701 being in the field of view 760. In FIGS. 7A to 7D, the arrangements described operate to hide any object clipping caused by the object 701 entering the field of view 760, but also to prevent the object 701 from causing a disruptive occlusion when entering the field of view 760. The application 133 determines that the object 701 will cause a disruptive occlusion based upon an amount of time indicated by a line 736. If the amount of time indicated by line 736 is below a threshold, e.g. 1 second, execution of step 430 determines that the object's (701) sudden appearance in the field of view 760 will cause a disturbance to the field of view 760. A transition effect is assigned to gradually introduce the object 701 into the field of view 760. Accordingly, the transition effect is determined based upon the position of the object 701 relative to the clipping plane 740.

Once the transition effect is determined, occlusion thresholds 738 and 739 are used to apply the transition effect at step 350. In the example of FIGS. 7A to 7D at step 350, application of the transition effect begins when the occlusion profile 731 meets a first threshold requirement (traverses the upper occlusion threshold 738 at mark C 734) and completes application of the transition effect when the occlusion profile meets a second threshold requirement (traverses the lower threshold at mark D 735).

Figure 7D:
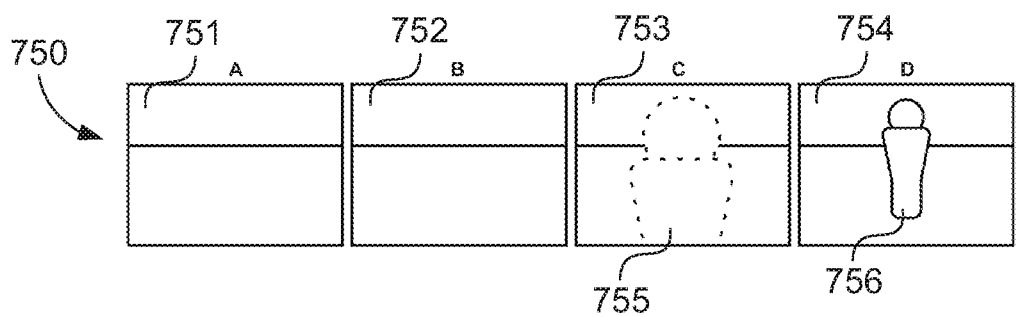

A sequence 750 of FIG. 7D shows video frames 751 to 754 rendered by the virtual camera 703 when the object 701 is at the points A 705, B 706, C 707 and D 708 and the arrangements described are practiced. Frames A 751, B 752, C 753 and D 754 of the sequence 750 respectively show an object 755 (corresponding to the object 701) approaching the virtual camera 703 from behind and then moving away from the virtual camera 703. As a result of executing step 350, in frame C 753 the object 755 is rendered to be transparent or imperceptible to a viewer (indicated by dotted lines) and in frame D 754 an object 756 (corresponding to the object 755) is visible. In between frames B 752 and C 753 the object 701 is clipped, however the virtual camera 703 does not render the object 701 as the object 701 has a transition effect applied so as to be substantially transparent or invisible.

FIGS. 8A to 8D show an example scenario where an object, in this case a person, is approaching a virtual camera from behind the camera, diagonally into a field of view of the virtual camera.

Figure 8A:
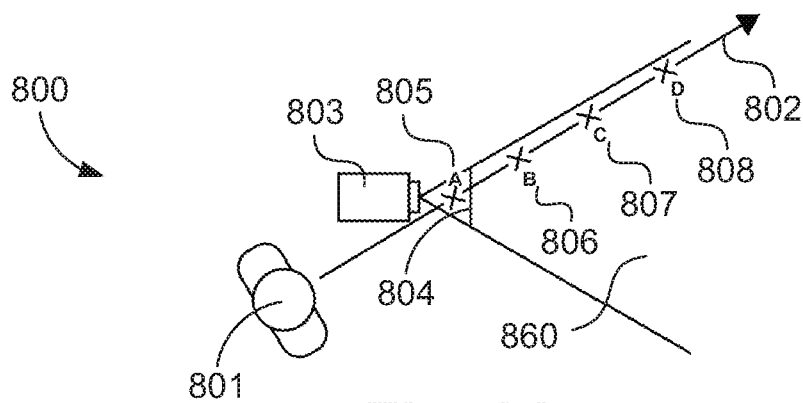
FIGS. 8A to 8D show an alternate example of applying a transition effect based on an occlusion measure when an object is approaching from behind a virtual camera.

FIG. 8A show a top down view of a scene 800. An object 801, a person, is approaching a virtual camera 803 with a trajectory 802. The camera 803 has a field of view 860. Points A 805, B 806, C 807 and D 808 each respectively represent sequential moments of the object 801 moving along the trajectory 802. Point A 805 represents a moment when the object 801 is behind the near clipping plane 804. Points B 806, C 807 and D 808 represent moments when the object 801 has passed the near clipping plane 804.

Figure 8B:
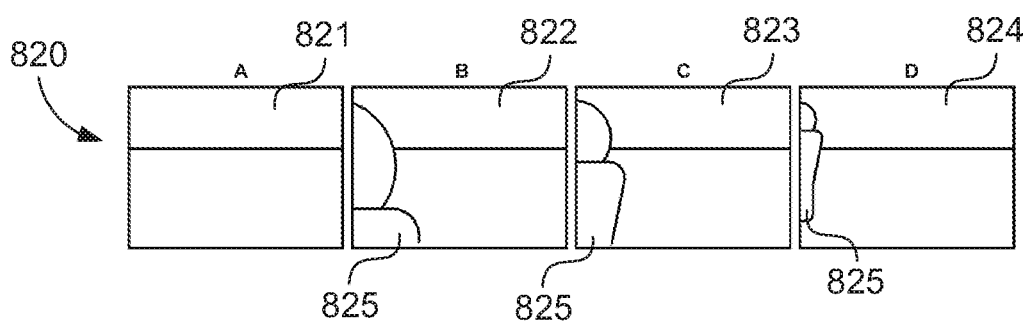

A sequence 820 in FIG. 8B shows video frames captured by the virtual camera 803 when the object 801 is at the points A 805, B 806, C 807 and D 808 and the methods described are not practiced for reference. Frames A 821, B 822, C 823 and D 824 of the sequence 820 respectively show an object 825 (corresponding to the object 801) entering the field of view 860 diagonally and moving away from the virtual camera 803. The object 825 is visibly clipped by the near clipping plane 804 in frames between frame A 821 and frame B 822.

Figure 8C:
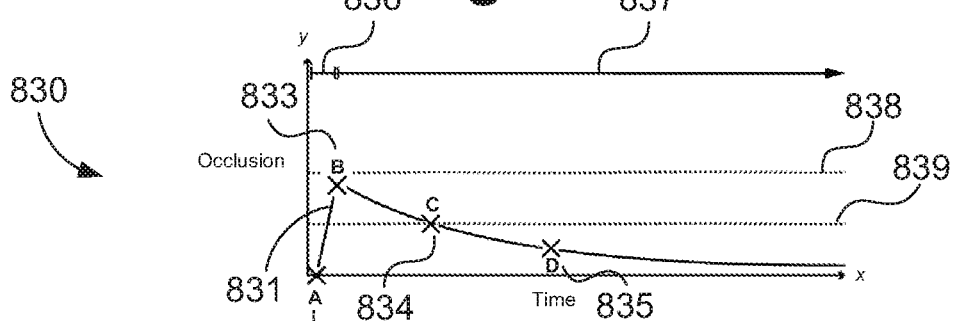

FIG. 8C shows a corresponding graph 830 of an occlusion profile for the object 801 as a result of execution of step 420. An occlusion profile 831 shows an amount of occlusion the object 801 causes over time in the field of view 860. Points A 805, B 806, C 807 and D 808 of FIG. 8A are represented on the occlusion profile 831 as markings A 832, B 833, C 834 and D 835 respectively. As the object 801 starts out of the field of view 860 the profile 831 starts with zero occlusion as represented by Point A 832. The marking B 834 represents a moment of peak occlusion after the object 801 enters the field of view 860 and stops being clipped by the clipping plane 804.

The method 400 continues to step 430 to determine a transition effect for the object 701. Addition of amounts of time indicated by lines 836 and 837 at step 430 determines a total time for the object 801 being in the field of view 860. In the example of FIGS. 8A to 8D, to the arrangements described operate to select a transition effect to hide any object clipping caused by the object 801 entering the field of view 860. In FIGS. 8A to 8B the object will not cause a disruptive occlusion because even though the amount of time indicated by the line 836 is below a time threshold (for example 1 second in FIG. 8C) the peak occlusion (mark B 833) is within acceptable limits. Acceptable limits relate to the occlusion occurring below an upper occlusion threshold 838.

The selected transition effect is applied at step 350. Once the application 1333 has determined a transition effect the object 801 the occlusion thresholds 838 and 839 are used to apply the transition effect. At step 350, the application 1333 begins the transition effect at the mark B 833 as the occlusion profile 831 peaks below the occlusion threshold 838. The application 1333 completes the transition when the occlusion profile 831 traverses the lower threshold 839 at mark C 834. Accordingly, the transition effect is applied based upon the occlusion profile (measure) 831 satisfying at least one threshold.

Figure 8D:
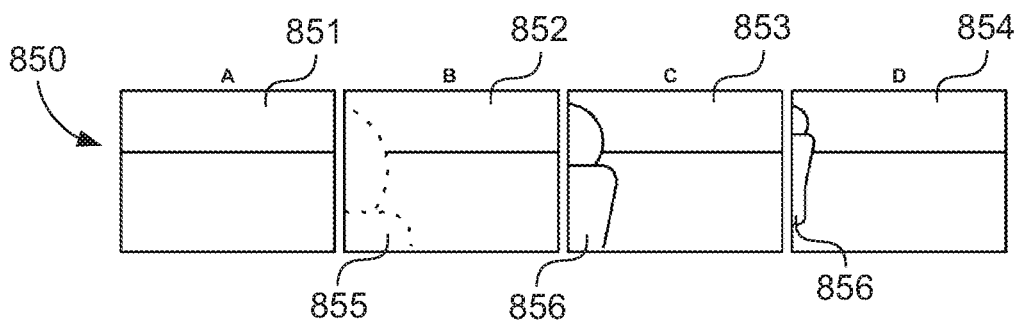

A sequence 850 in FIG. 8D shows video frames captured by the virtual camera 803 when the object 801 is at the points A 805, B 806, C 807 and D 808 when the arrangements described are practiced. Frames A 851, B 852, C 853 and D 854 of the sequence 850 respectively show an object 855 (corresponding to the object 801) entering the field of view 860 diagonally and moving away from the camera 803. As a result of executing step 350, the object 855 has the transition effect applied to render the object 855 invisible (indicated by the dotted lines) in frame B 852 and the object 856 is visible in frame C 853. In between frames A 851 and B 852 the object 855 is clipped, however the camera 803 does not render the object 855 as the selected transition effect relate to being transparent or invisible.

FIGS. 9A to 9D show an example scenario where an object, in this case a person, is moving across a virtual camera's field of view, relatively close to the virtual camera.

Figure 9A:
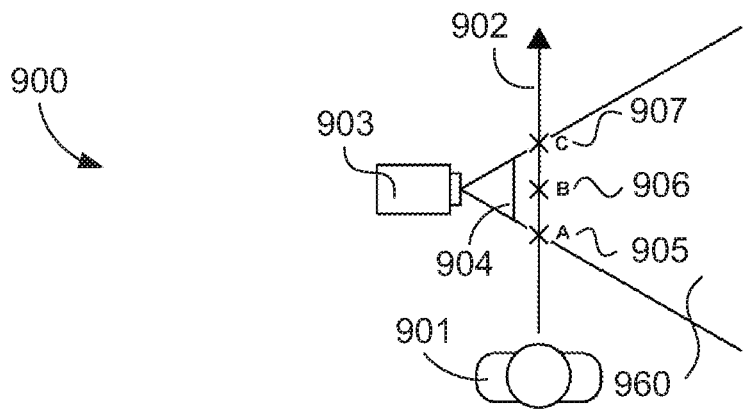
FIGS. 9A to 9D show an example scenario of applying a transition effect based on an occlusion measure when an object is approaching perpendicular to a virtual camera's field of view and close to the virtual camera.

FIG. 9A shows a top down view of a scene 900. An object 901 is approaching a virtual camera 903 with a trajectory 902. The virtual camera 903 has a field of view 960. Points A 905, B 906 and C 907 each respectively represent sequential moments of the object 901 moving along the trajectory 902. Point A 905 represents a moment when the object 901 enters the field of view 960. Point B 906 represents a moment when the object 901 fully appears in the field of view 960. Point C 907 represents a moment when the object 901 exits the field of view 960.

Figure 9B:
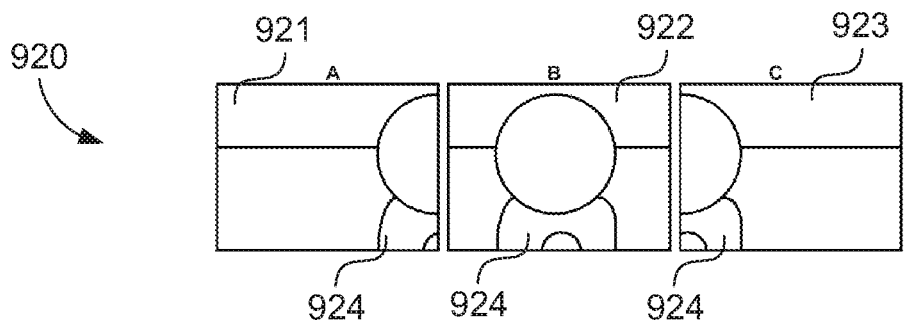

A sequence 920 in FIG. 9B shows video frames captured by the virtual camera 703 when the object 801 is at the points A 905, B 906 and C 907 and the arrangements described not practiced, for reference. Frames A 921, B 922 and C 923 of the sequence 920 respectively show an object 924 (corresponding to the object 901) entering the field of view 960 and moving across the field of view 960 at points A 905, B 906 and C 907. The object 925 rapidly enters and then leaves the field of view 960, causing occlusion in the frames A 921, B 922 and C 923.

Figure 9C:
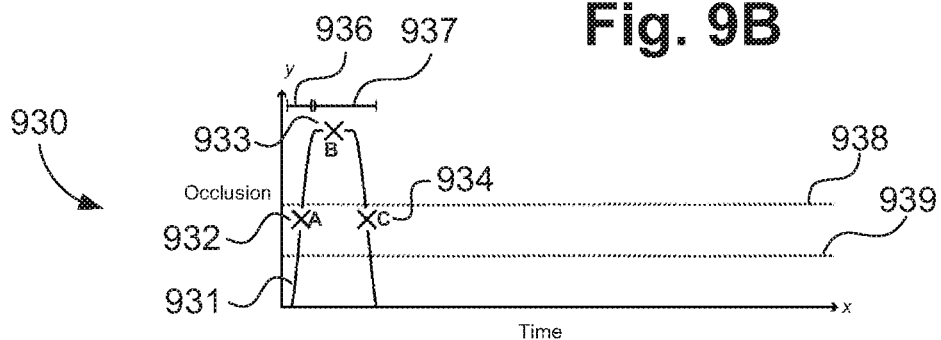

FIG. 9C shows a graph 930 of an occlusion profile for the object 901 as a result of executing step 420. An occlusion profile 931 shows an amount of occlusion the object 901 causes in the field of view 960 over time. Points A 905, B 906 and C 907 are represented on the occlusion profile 931 as markings A 932, B 933 and C 934 respectively. The marking B 933 represents a moment of peak occlusion after the object 901 enters the field of view 960.

The step 430 executes to assign a transition effect to the object 701. Addition of amounts of time indicated by lines 936 and 937 at step 430 determines a total time for the object 901 being in the field of view 960. In the example of FIGS. 9A to 9D, the arrangements described operate to prevent the object 901 from causing a disruptive occlusion when entering the field of view 960. The application 1333 determines that the object 1333 will cause a disruptive occlusion by determining that the occlusion profile 931 surpasses an upper occlusion threshold 938. After determining that the object 901 will cause an occlusion, the amounts of time indicated by the lines 936 and 937 are combined to determine that a total time is below a minimum appearance threshold (e.g. 1 second). As the occlusion profile 831 indicates that object 901 will cause an occlusion and will relatively quickly enter and exit the field of view 960, the application 1333 selects not to transition the object 901 into the field of view 960. The transition effect is effectively determined based upon the amount of time the object 901 is in the virtual view associated with the field of view 960. Further, the transition effect is determined by comparing an amount of time the object is in the virtual view to the threshold of 1 second. The threshold can be determined through user or audience testing in some arrangements. The step 430 operates to apply a transition effect of "not display", or in some arrangements, a transition effect of transparency.

Figure 9D:
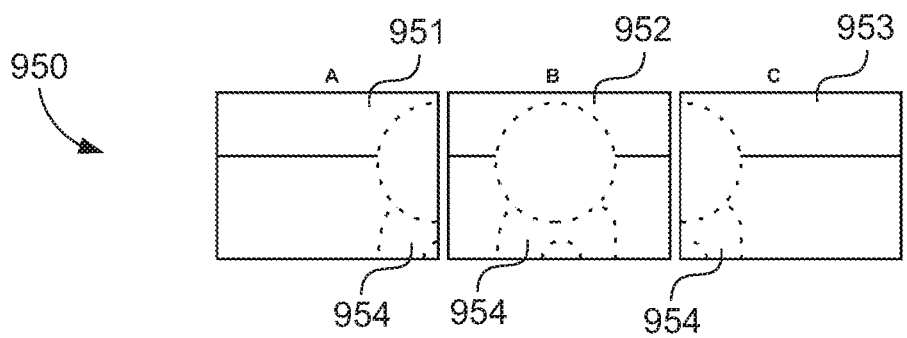

The step 350 executes to apply the determined transparency. A sequence 950 in FIG. 9D shows video frames captured by the virtual camera 903 when the object 901 is at the points A 905, B 906 and C 907 and the arrangements described are practiced. As a result of executing step 350, in frames A 951, B 952 and C 953 the object 954 is rendered as transparent (as indicated by the dotted lines 954). In the example of FIG. 9D, the transition effect is applied for all frames in the sequence 950 rather than those frames in which the occlusion profile 831 is between occlusion thresholds 938 and 939.

FIGS. 10A to 10D show an example scenario where an object, in this case a ball, is moving across a camera's field of view, close to the camera.

Figure 10A:
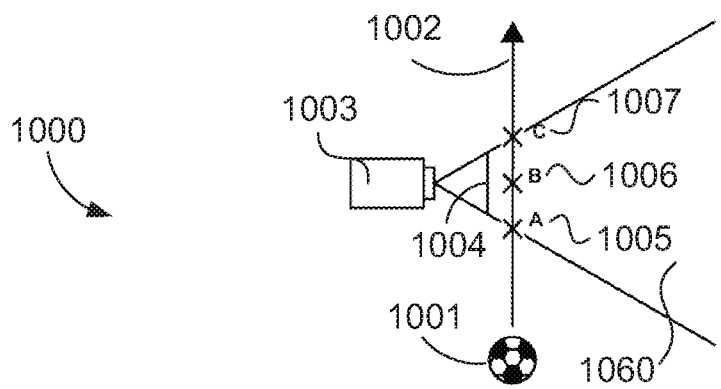
FIGS. 10A to 10D show an example scenario of applying a transition effect based on an occlusion measure when an object is approaching perpendicular to a virtual camera's field of view and far from the virtual camera.

FIG. 10A shows a top down view of a scene 1000. An object 1001, a ball, is approaching a virtual camera 1003 with a trajectory 1002. The virtual camera 1003 has a field of view 1060.

Points A 1005, B 1006 and C 1007 each respectively represent sequential moments of the ball 1001 moving along the trajectory 1002. Point A 1005 relates to a moment when the object 1001 enters the field of view 1060. Point B 1006 represents a moment when the object 1001 fully appears in the field of view 1060. Point C 1007 relates to a moment when the object exits the field of view 1060. The virtual camera 1003 has a near clipping plane 1004. The points A 1005, B, 1006 and C 1007 are all outside the clipping plane 1004.

Figure 10B:
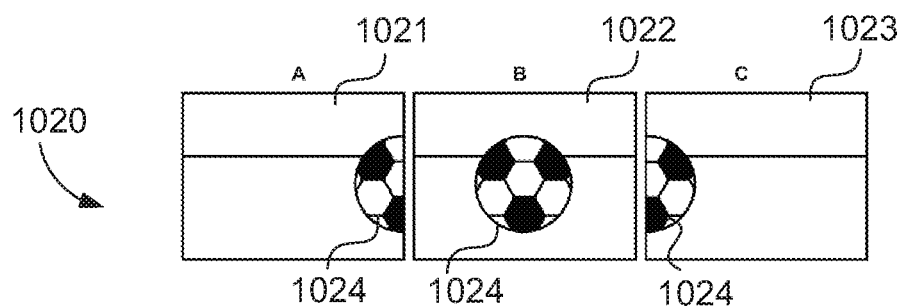

FIG. 10B shows a sequence 1020 of video frames captured by the virtual camera 1003 when the object 1001 is at the points A 1005, B 1006 and C 1007 and the arrangements described are not practiced, for reference. Frames A 1021, B 1022 and C 1023 of the sequence 1020 respectively show an object 1024 (corresponding to the ball 1001) entering the field of view 1060 and moving across the field of view at points A 1005, B 1006 and C 1007. The object 1024 rapidly enters and then leaves the field of view 1060.

Figure 10C:
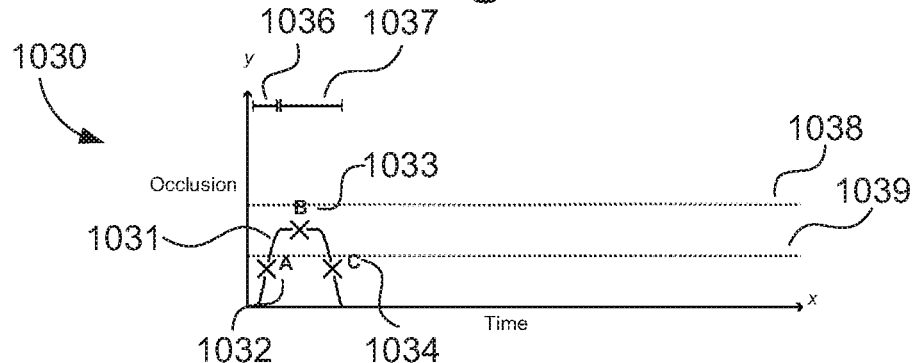

FIG. 10C shows a graph 1030 of an occlusion profile for the object 1001 as a result of executing step 420. An occlusion profile 1031 shows an amount of occlusion the object 1001 causes over time. Points A 1005, B 1006 and C 1007 of FIG. 10A are represented on the occlusion profile 1031 as markings A 1032, B 1033 and C 1034 respectively. The marking B 1034 represents a moment of peak occlusion after the object 1001 enters the field of view 1060.

Step 430 executes to assign a transition effect or transition to the ball 1001. Addition of amounts of time indicated by lines 1036 and 1037 at step 430 determines a total time for the object 1001 being in the field of view 1060. The amount of peak occlusion indicated by marking B 1033 is lower than an upper occlusion threshold 1138, indicating that the object 1001 does not cause a negative occlusion. Regardless of the relatively short amount of time the object 1001 is in the field of view 1060, no negative occlusion is caused. The application 1333 assigns transition effect to make the object 1001 visible as soon as the object 1001 enters the field of view 1060.

Figure 10D:
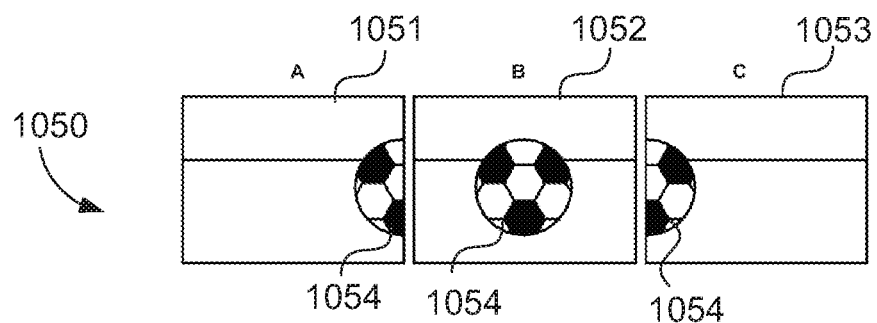

A sequence 1050 of FIG. 10D shows video frames captured by the virtual camera 1003 when the object 1001 is at points A 1005, B 1006 and C 1007 of FIG. 10A and the arrangements described are practiced. As a result of execution of step 350, an object 1054 (corresponding to the ball 1001) is rendered to be visible (displayed) in each of the frames A 1051, B 1052 and C 1053 of the sequence 1050.

FIGS. 11A to 11D show an example scenario where an object, in this case a person, is moving across a virtual camera's field of view, far from the virtual camera.

Figure 11A:
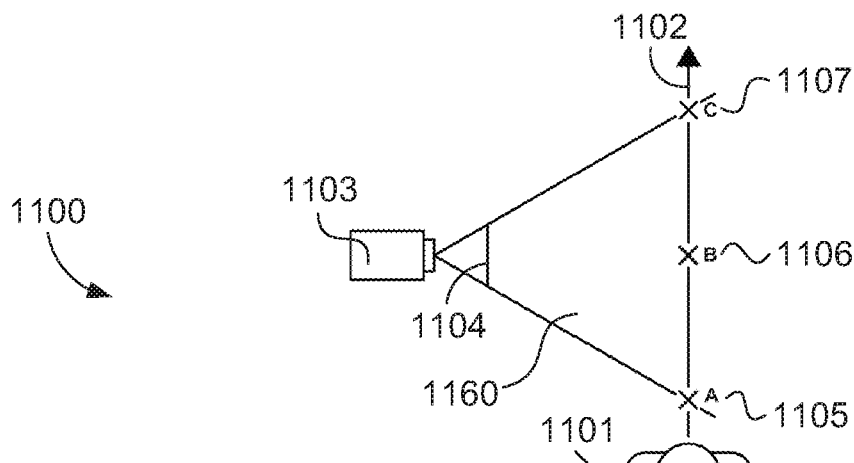
FIGS. 11A to 11D show an example scenario of applying a transition effect based on an occlusion measure when an object is moving across a virtual camera's field of view, far from the virtual camera.

FIG. 11A shows a top down view of a scene 1100. An object 1101, a person, is approaching a virtual camera 1103 with a trajectory 1102. The virtual camera 1103 has a field of view 1160. Points A 1105, B 1106 and C 1107 each respectively represent sequential moments of the object 1103 moving along the trajectory 1102. Point A 1105 relates a moment when the object enters the field of view 1160. Point B 1106 relates to a moment when the object 1101 fully appears in the field of view 1160. Point C 1107 relates to a moment when the object 1101 exits the field of view 1160.

Figure 11B:
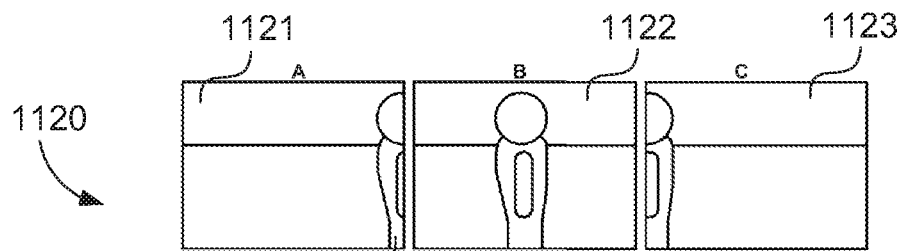

FIG. 11B shows a sequence of video frames captured by the virtual camera 1103 when the object 1101 is at the points A 1105, B 1106 and C 1107 and the arrangements described are not practiced, for reference. Frames A 1121, B 1122 and C 1123 of the sequence 1120 respectively show an object 1124 (corresponding to the person 1101) entering the field of view 1160 and moving across the field of view 1160 at the points A 1105, B 1106 and C 1107. The object 1124 enters and then leaves the field of view 1160, without causing disruptive occlusion.

Figure 11C:
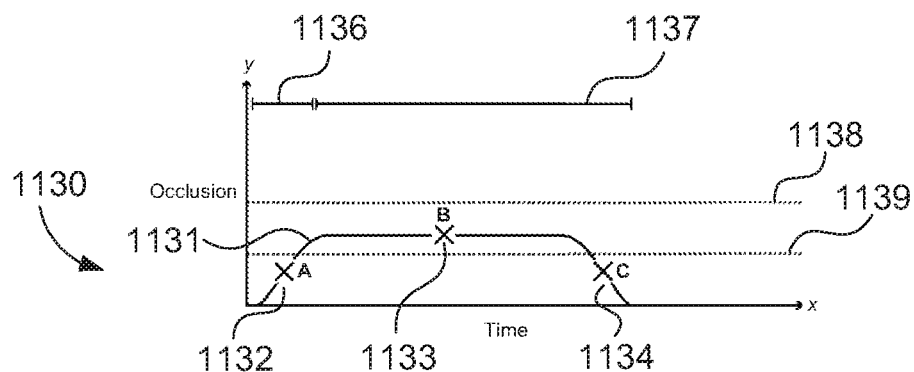

FIG. 11C shows a graph 1130 of an occlusion profile for the object 1101 as a result of execution of step 420. An occlusion profile 1131 shows an amount of occlusion the object 1101 causes over time. Points A 1105, B 1106 and C 1107 of FIG. 11A are represented on the occlusion profile 1131 as markings A 1132, B 1133 and C 1134 respectively. The marking B 1133 represents a moment of peak occlusion after the object 1101 enters the field of view 1160.

Step 430 is executed to assign or determine a transition effect for the person 1101. Addition of amounts of time indicated by lines 1136 and 1137 determines a total time for the object 1101 being in the field of view 1160. The amount of peak occlusion indicated by marking B 1133 is lower than an upper occlusion threshold 1138, indicating that the object 1101 does not cause disruptive occlusion. As no disruptive occlusion is caused, step 430 executes to determine a transition effect to make the object 1101 visible as soon as the object 1101 enters the field of view 1160.

Figure 11D:
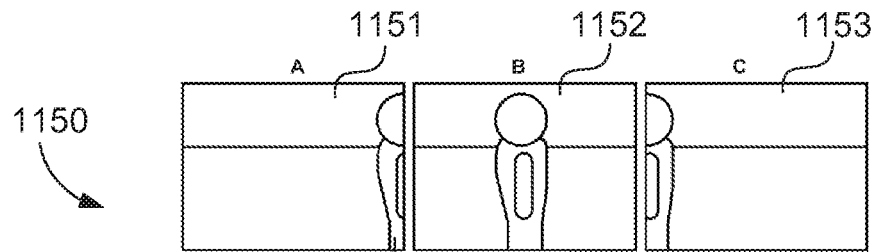

A sequence 1150 of FIG. 11D shows video frames captured by the camera 1103 when the object 1101 is at the points A 1105, B 1106 and C 1107 when the arrangements described are practiced. As a result of execution of the step 350, an object 1154 (corresponding to the object 1101) is rendered as visible in the sequence 1150 in each of the frames A 1151, B 1152 and C 1153.

FIGS. 12A to 12D show an example scenario where there are two objects on trajectories towards each other in a field of view of a virtual camera. The trajectories determined likely result in an interaction between the two objects. A first one of the objects is a person approaching the virtual camera from in front of the virtual camera into a field of view. The second object is a person approaching the virtual camera from behind the camera into the field of view. The application 1333 executes to determine how the two objects are going to interact with each other by determining the trajectory of each object and the trajectories will intersect.

Figure 12A:
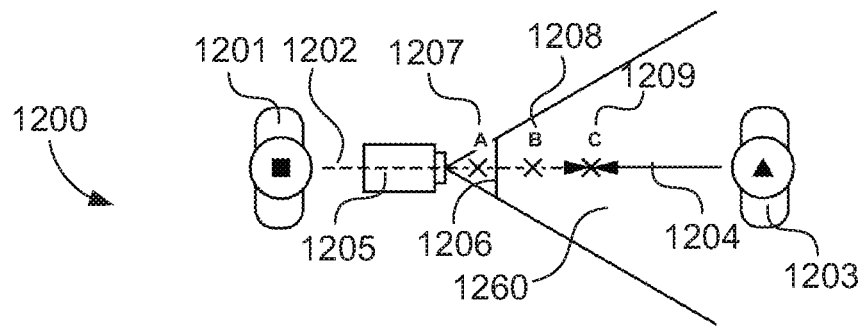
FIGS. 12A to 12D show an example scenario off rendering an object when two objects interact in front of a virtual camera.

FIG. 12A shows a top down view of a scene 1200. A first object 1201, a person, is approaching a virtual camera 1205 from behind with a trajectory 1202. The virtual camera 1205 has a field of view 1260. A second object 1203 is approaching the virtual camera 1205 from the front with a trajectory 1204. Points A 1207, B 1208 and C 1209 each respectively represent sequential moments related to the first object 1201 of the object moving along the trajectory 1202. Point A 1207 relates to a moment when the object 1201 is behind a near clipping plane 1204 of the camera 1205. Points B 1208 and C 1209 relate to moments when the object 1201 has passed the near clipping plane 1204.

Figure 12B:
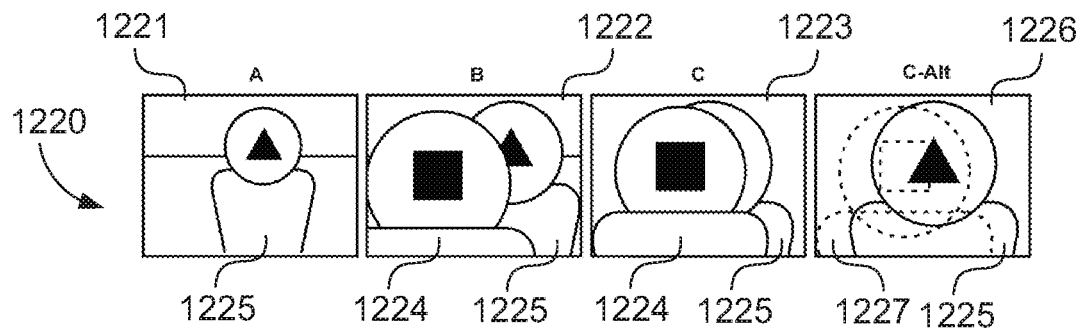

A sequence 1220 in FIG. 12B shows video frames captured by the camera 1205 from the points A 1207, B 1208 and C 1209 when the arrangements described are not practiced, for reference. Frame A 1221 of the sequence 1220 shows a second object 1225 (corresponding to the person 1203) alone in the field of view 1260. Frame B 1222 of the sequence 1220 shows a first object 1224 (corresponding to the person 1201) in front of the second object 1225 after entering the field of view 1260. In between frames A 1221 and B 1222, clipping of the first object 1224 would be visible in video data rendered by the virtual camera 1205. Frame C 1223 of the sequence 1220 shows the first and second objects 1224 and 1225 interacting.

To treat the objects 1201 and 1203 individually, the first object 1201 has a transition effect selected and applied in a similar manner to the person 701 described in relation to FIGS. 7A to 7D. A transition effect is assigned and applied for the second object 1203 using a similar approach to that described in FIGS. 6A to 6D. If the methods used in FIGS. 6A to 6D and FIGS. 7A to 7D were implemented simultaneously, an alternate frame C-Alt 1226 would be captured by the virtual camera 1205 at moment C 1209. At the point of interaction point C 1209, a first object 1227 (corresponding to the object 1224) would be invisible to a viewer while the second object 1225 would be visible to the viewer. In FIGS. 12A to 12D, treating the objects 1201 and 1203 individually would produce an unfavorable result.

Figure 12C:
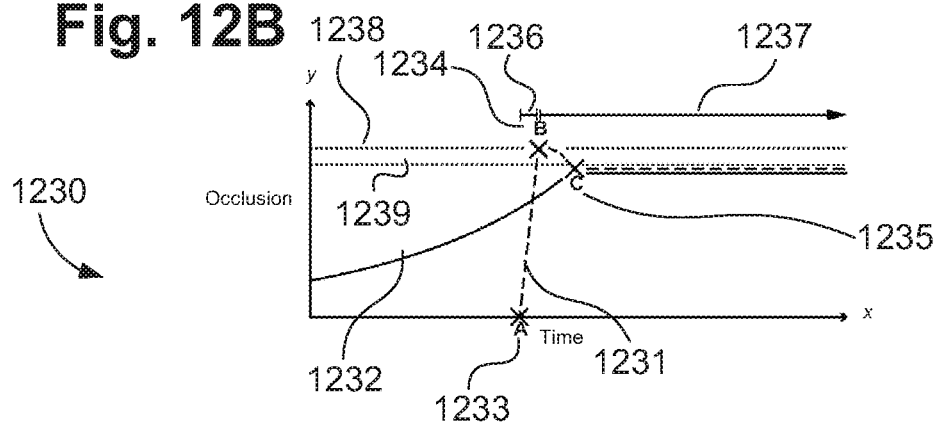

FIG. 12C shows a graph 1230 of an occlusion profile for the first object 1201 and the second object 1203 of FIG. 12A as a result of execution of step 420. An occlusion profile 1231 for the first object 1201 shows an amount of occlusion the object 1201 causes over time. Points A 1207, B 1208 and C 1209 of FIG. 1A are represented on the occlusion profile 1231 as markings A 1233, B 1234 and C 1235 respectively. As the first object 1201 starts outside of the field of view 1260 the profile 1231 starts with zero occlusion as represented by the Point A 1233. Marking B 1234 represents the moment of peak occlusion after the object 1201 enters the field of view 1260 and stops being clipped by the clipping plane 1206.

The application 1333 executes step 430 to assign or select a transition effect. Addition of the amounts of time indicated by lines 1236 and 1237 determines a total time for the object 1201 being in the field of view 1260. In the example of FIGS. 12A to 12D, the application 1333 executes to select and apply a transition effect to first hide any object clipping caused by the first object 1201 entering the field of view 1260. The application 1333 also executes to select and apply a transition effect to prevent the first object 1201 from causing a disruptive occlusion on entering the field of view 1260, but also to ensure the first object 1201 is visible by a moment of interaction between the two objects 1201 and 1203. The upper and lower occlusion thresholds referred to in previously described examples are modified based upon the objects interacting with one another. The application 133 executes at step 430 to modify an upper occlusion threshold 1238 to a point at which the first object 1201 is no longer clipped. The application 133 also executes to modify a lower threshold 1239 to a level of occlusion at the interaction point represented by mark C 1235. Accordingly, the transition effect is determined based upon other objects in the virtual view rendered by the virtual camera 1205.

Once the transition effect has been assigned for the first object 1201, the application 1333 uses the modified occlusion thresholds 1238 and 1239 to apply the transition effect at step 350. In the example of FIGS. 12A to 12B, at step 350, the transition effect is applied at mark B 1234, which coincides with the upper occlusion threshold 1238. The application 1333 completes the transition effect at the interaction point represented by the mark C 1235. The mark C now coincides with the lower occlusion threshold 1238. In the example of FIGS. 12A to 12D, the transition effect is applied based upon the occlusion profile 531 satisfying modified thresholds.

Figure 12D:
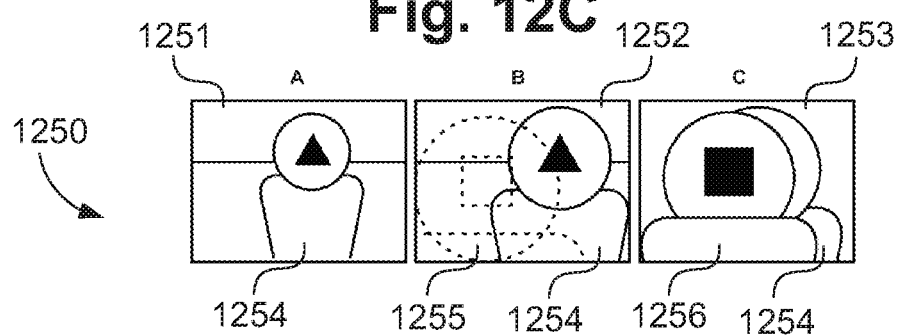

FIG. 12D shows a sequence of video frames captured by the virtual camera 1205 when the object 1203 is at the points A 1207, B 1208 and C 1209 and the arrangements described are practiced. Frame A 1251 shows a second object 1254 (corresponding to the object 1203) alone in the field of view 1260. Frame B 1252 shows a first object 1255 (corresponding to the person 1201) substantially transparent or invisible in front of the second object 1203 after entering the field of view 1260. Frame C 1253 shows a first object 1256 and the second object 1254 visible interacting in the field of view 1260.

The arrangements described are applicable to the computer and data processing industries and particularly for broadcast industries such as the live broadcast industries.

In determining the occlusion profile and selecting and applying a transition effect in the implementations described above, the arrangements described provide an advantage of reducing clipping effects in generating a virtual view. The resultant rendered a virtual view (for example video data) is typically less jarring to a viewer. Further, by using the occlusion profile, a transition effect is selected according to the specific trajectory for the object. The context of the filmed environment, such as the object 140 in the arena 110, is maintained. Workload of an operator of the controller 180 is effectively reduced as the operator is not required to constantly manage the position and proximity of the virtual camera around objects both within and outside the field of view of the camera, while at the same time tasked to capture compelling footage.

The foregoing describes only some embodiments of the present invention, and modifications and/or changes can be made thereto without departing from the scope and spirit of the invention, the embodiments being illustrative and not restrictive.

The invention claimed is:

1. A method comprising:
    determining an image effect to be applied to an object within a field of view of a virtual camera based on a position of the object and a position of the virtual camera; and
    generating, based on a plurality of images captured from different directions by a plurality of image capturing apparatuses, a virtual view video according to the position and an orientation of the virtual camera, the determined image effect being applied to the object in the virtual view video,
    wherein a condition for applying the determined image effect is changed based on an interaction between a plurality of objects due to intersecting of trajectories of the plurality of objects within the field of view of the virtual camera.

2. The method according to claim 1, wherein the image effect to be applied to the object is determined based on a trajectory of the object and the position of the object along the trajectory.

3. The method according to claim 1, wherein the image effect includes at least one of selecting whether to display or not display, fade in, fade out, transparency transition, changing of colour transform, changing of blend, changing of brightness, changing of saturation, changing of texture, changing of visual effect and changing of style, of the object.

4. The method according to claim 1, wherein the image effect is determined based upon other objects in the field of view of the virtual camera.

5. The method according to claim 1, wherein determining the image effect further comprises determining a variation of an occlusion measure of the object over time.

6. The method according to claim 5, wherein the occlusion measure is an evaluation of an occlusion of the field of view of the virtual camera by the object.

7. The method according to claim 5, wherein the variation of the occlusion measure is determined based on a trajectory of the object.

8. The method according to claim 5, wherein the variation in the occlusion measure is determined on a per object basis if more than one object is in the field of view of the virtual camera.

9. The method according to claim 5, wherein the occlusion measure is determined based on a size of the object relative to the field of view of the virtual camera.

10. The method according to claim 5, wherein the image effect is applied based upon the occlusion measure satisfying a threshold.

11. The method according to claim 5, wherein the image effect is applied when the occlusion measure satisfies a first threshold and completes when the occlusion measure satisfies a second threshold.

12. The method according to claim 5, wherein the image effect is applied based upon the occlusion measure satisfying at least one threshold, and the at least one threshold is modified based upon the object interacting with another object in the field of view of the virtual camera.

13. The method according to claim 1, wherein the image effect is determined based on a type of the object.

14. The method according to claim 1, wherein the image effect is determined based upon a position of the object relative to a clipping plane associated with the field of view of the virtual camera.

15. The method according to claim 1, wherein the image effect is determined based upon an amount of time the object is in the field of view of the virtual camera.

16. The method according to claim 1, wherein the image effect is determined by comparing an amount of time the object is in the field of view of the virtual camera to a threshold.

17. The method according to claim 1, wherein the image effect is a visual effect.

18. The method according to claim 1, wherein the position of the object along a trajectory of the a object within the field of view is predicted.

19. The method according to claim 1, further comprising: causing a display device to display the generated virtual view video.

20. The method according to claim 1, wherein the image effect to be applied to the object is determined such that the object becomes transparent in a case where a distance between the position of the object and the position of the virtual camera becomes shorter than a predetermined distance.

21. The method according to claim 1, wherein the image effect to be applied to the object is determined such that the object is gradually visualized in the virtual view video in a case where the object moves away from a position near the virtual camera within the field of view of the virtual camera.

22. The method according to claim 1, wherein the object to which the image effect is applied is an object occluding another object.

23. A non-transitory computer readable medium having a program stored thereon implementing a method, the program comprising:

code for determining an image effect to be applied to an object within a field of view of a virtual camera based on a position of the object and the position of the virtual camera; and code for generating, based on a plurality of images captured from different directions by a plurality of image capturing apparatuses, a virtual view video according to the position and an orientation of the virtual camera, the determined image effect being applied to the object in the virtual view video, wherein a condition for applying the determined image effect is changed based on an interaction between a plurality of objects due to intersecting of trajectories of the plurality of objects within the field of view of the virtual camera.

24. Apparatus, the apparatus configured to:

determine an image effect to be applied to an object within a field of view of a virtual camera based on a position of the object and a position of the virtual camera; and generate, based on a plurality of images captured from different directions by a plurality of image capturing apparatuses, a virtual view video according to the position and an orientation of the virtual camera, the determined image effect being applied to the object in the virtual view video, wherein a condition for applying the determined image effect is changed based on an interaction between a plurality of objects due to intersecting of trajectories of the plurality of objects within the field of view of the virtual camera.

25. The apparatus according to claim 24, wherein the image effect to be applied to the object is determined such that the object becomes transparent in a case where a distance between the position of the object and the position of the virtual camera becomes shorter than a predetermined distance.

26. The apparatus according to claim 24, wherein the image effect to be applied to the object is determined such that the object is gradually visualized in the virtual view video in a case where the object moves away from a position near the virtual camera within the field of view of the virtual camera.

27. The apparatus according to claim 24, wherein the object to which the image effect is applied is an object occluding another object.

* * * * *